(12) United States Patent
Withrow et al.

(10) Patent No.: US 11,700,123 B2
(45) Date of Patent: Jul. 11, 2023

(54) ASSET-BACKED DIGITAL SECURITY TOKENS

(71) Applicant: ALITHEON, INC., Bellevue, WA (US)

(72) Inventors: Justin Lynn Withrow, Bellevue, WA (US); David Justin Ross, Bellevue, WA (US)

(73) Assignee: Alitheon, Inc., Bellevue, WA (US)

( * ) Notice: Subject to any disclaimer, the term of this patent is extended or adjusted under 35 U.S.C. 154(b) by 0 days.

(21) Appl. No.: 17/350,132

(22) Filed: Jun. 17, 2021

(65) Prior Publication Data

US 2021/0399893 A1 Dec. 23, 2021

Related U.S. Application Data

(60) Provisional application No. 63/040,423, filed on Jun. 17, 2020.

(51) Int. Cl.
*G06Q 40/00* (2023.01)
*H04L 9/32* (2006.01)
*H04L 9/00* (2022.01)

(52) U.S. Cl.
CPC ............ *H04L 9/3213* (2013.01); *G06Q 40/00* (2013.01); *H04L 9/3263* (2013.01); *H04L 9/50* (2022.05)

(58) Field of Classification Search
CPC ....... H04L 9/3213; H04L 9/3263; H04L 9/50; G06Q 40/00
See application file for complete search history.

(56) References Cited

U.S. PATENT DOCUMENTS

| 4,218,674 A | 8/1980 | Brosow et al. |
| 4,423,415 A | 12/1983 | Goldman |
| 4,677,435 A | 6/1987 | Causse et al. |

(Continued)

FOREIGN PATENT DOCUMENTS

| DE | 102006005927 A1 | 8/2007 |
| EP | 0439669 A2 | 8/1991 |

(Continued)

OTHER PUBLICATIONS

Julia S. Cheney, Identity Theft: Do Definitions Still Matter?, Aug. 2005, Federal Reserve Bank of Philadelphia, web edition, 2-18 (Year: 2005).*

(Continued)

*Primary Examiner* — I Jung Liu
(74) *Attorney, Agent, or Firm* — Brake Hughes Bellermann LLP

(57) ABSTRACT

A rights server system comprises a combination of digital fingerprint authentication techniques, processes, programs, and hardware that facilitate the creation, assignment, management, and enforcement of rights related to a physical object. An unspoofable, secure linkage is created between a physical object and an associated digital file through a digital fingerprint of the object. The digital fingerprint must be unambiguously derived from the object. The rights server manages interests in the physical object through issuing digital tokens which are linked to the associated digital file. Digital tokens linked to and backed by the physical object can serve as a type of currency or medium of exchange of real value.

22 Claims, 9 Drawing Sheets

(56) References Cited

U.S. PATENT DOCUMENTS

| | | |
|---|---|---|
| 4,700,400 A | 10/1987 | Ross |
| 4,883,971 A | 11/1989 | Jensen |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,961,466 B2 | 11/2005 | Imagawa et al. |
| 6,985,925 B2 | 1/2006 | Ogawa |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce et al. |
| 7,477,780 B2 | 1/2009 | Boncyk et al. |
| 7,518,080 B2 | 4/2009 | Amato |
| 7,602,938 B2 | 10/2009 | Prokoski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | Delavergne |
| 7,748,029 B2 | 6/2010 | Ross |
| 7,822,263 B1 | 10/2010 | Prokoski |
| 7,834,289 B2 | 11/2010 | Orbke et al. |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,180,174 B2 | 5/2012 | Di et al. |
| 8,180,667 B1 | 5/2012 | Baluja et al. |
| 8,194,938 B2 | 6/2012 | Wechsler et al. |
| 8,316,418 B2 | 11/2012 | Ross |
| 8,374,020 B2 | 2/2013 | Katti |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette et al. |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig et al. |
| 8,526,743 B1 | 9/2013 | Campbell et al. |
| 8,774,455 B2 | 7/2014 | Elmenhurst et al. |
| 8,959,029 B2 | 2/2015 | Jones et al. |
| 9,031,329 B1 | 5/2015 | Farid et al. |
| 9,058,543 B2 | 6/2015 | Campbell et al. |
| 9,152,862 B2 | 10/2015 | Ross et al. |
| 9,170,654 B1 | 10/2015 | Boncyk et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,424,461 B1 | 8/2016 | Yuan et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 9,665,800 B1 | 5/2017 | Kuffner |
| 9,741,724 B2 | 8/2017 | Seshadri et al. |
| 10,037,537 B2 | 7/2018 | Withrow et al. |
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,505,726 B1 | 12/2019 | Andon et al. |
| 10,540,664 B2 | 1/2020 | Ross et al. |
| 10,572,883 B2 | 2/2020 | Ross et al. |
| 10,621,594 B2 | 4/2020 | Land et al. |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0134836 A1 | 9/2002 | Cash et al. |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2004/0250085 A1 | 12/2004 | Tattan et al. |
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0125360 A1 | 6/2005 | Tidwell et al. |
| 2005/0131576 A1 | 6/2005 | De et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0083414 A1 | 4/2006 | Neumann et al. |

(56) References Cited

U.S. PATENT DOCUMENTS

| | | |
|---|---|---|
| 2006/0109520 A1 | 5/2006 | Gossaye et al. |
| 2006/0131518 A1 | 6/2006 | Ross et al. |
| 2006/0177104 A1 | 8/2006 | Prokoski |
| 2006/0253406 A1 | 11/2006 | Caillon |
| 2007/0056041 A1 | 3/2007 | Goodman |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0008377 A1 | 1/2008 | Andel et al. |
| 2008/0011841 A1 | 1/2008 | Self et al. |
| 2008/0128496 A1 | 6/2008 | Bertranou et al. |
| 2008/0130947 A1 | 6/2008 | Ross et al. |
| 2008/0219503 A1 | 9/2008 | Di et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos |
| 2009/0271029 A1 | 10/2009 | Doutre |
| 2009/0287498 A2 | 11/2009 | Choi |
| 2009/0307005 A1 | 12/2009 | Omartin et al. |
| 2010/0027834 A1 | 2/2010 | Spitzig et al. |
| 2010/0054551 A1 | 3/2010 | Decoux |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0042171 A1 | 2/2012 | White et al. |
| 2012/0089639 A1 | 4/2012 | Wang |
| 2012/0130868 A1 | 5/2012 | Loeken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Di Venuto Dayer et al. |
| 2012/0250945 A1 | 10/2012 | Peng et al. |
| 2013/0162394 A1 | 6/2013 | Etchegoyen |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0184843 A1 | 7/2014 | Campbell et al. |
| 2014/0201094 A1 | 7/2014 | Herrington et al. |
| 2014/0270341 A1 | 9/2014 | Elmenhurst et al. |
| 2014/0314283 A1 | 10/2014 | Harding |
| 2014/0380446 A1 | 12/2014 | Niu et al. |
| 2015/0058142 A1 | 2/2015 | Lenahan et al. |
| 2015/0067346 A1 | 3/2015 | Ross et al. |
| 2015/0078629 A1 | 3/2015 | Gottemukkula et al. |
| 2015/0086068 A1 | 3/2015 | Mulhearn et al. |
| 2015/0117701 A1 | 4/2015 | Ross et al. |
| 2015/0127430 A1 | 5/2015 | Hammer |
| 2015/0248587 A1 | 9/2015 | Oami et al. |
| 2015/0287026 A1* | 10/2015 | Yang .............. G06Q 20/065 705/69 |
| 2015/0294189 A1 | 10/2015 | Benhimane et al. |
| 2015/0309502 A1 | 10/2015 | Breitgand et al. |
| 2015/0371087 A1 | 12/2015 | Ross et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0117631 A1 | 4/2016 | McCloskey et al. |
| 2016/0162734 A1 | 6/2016 | Ross et al. |
| 2016/0180546 A1 | 6/2016 | Kim et al. |
| 2016/0189510 A1 | 6/2016 | Hutz |
| 2016/0203387 A1 | 7/2016 | Lee et al. |
| 2016/0300234 A1 | 10/2016 | Moss-Pultz et al. |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0132458 A1 | 5/2017 | Short et al. |
| 2017/0153069 A1 | 6/2017 | Huang et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0249491 A1 | 8/2017 | MacIntosh et al. |
| 2017/0251143 A1 | 8/2017 | Peruch et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1 | 12/2017 | Withrow |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0144211 A1 | 5/2018 | Ross et al. |
| 2018/0315058 A1 | 11/2018 | Withrow et al. |
| 2018/0349694 A1 | 12/2018 | Ross et al. |
| 2019/0026581 A1 | 1/2019 | Leizerson |
| 2019/0034518 A1 | 1/2019 | Liu et al. |
| 2019/0034694 A1 | 1/2019 | Ross |
| 2019/0102873 A1 | 4/2019 | Wang et al. |
| 2019/0102973 A1 | 4/2019 | Oyama et al. |
| 2019/0130082 A1 | 5/2019 | Alameh et al. |
| 2019/0228174 A1* | 7/2019 | Withrow .............. G06F 21/604 |
| 2019/0287118 A1 | 9/2019 | Ross et al. |
| 2019/0342102 A1 | 11/2019 | Hao et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Shannon et al. |
| 2020/0334689 A1 | 10/2020 | Withrow |
| 2020/0349379 A1 | 11/2020 | Ross |
| 2020/0356772 A1 | 11/2020 | Withrow et al. |

FOREIGN PATENT DOCUMENTS

| | | |
|---|---|---|
| EP | 0759596 A2 | 2/1997 |
| EP | 1016548 A2 | 7/2000 |
| EP | 1016549 A1 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |

(56) References Cited

FOREIGN PATENT DOCUMENTS

| | | | |
|---|---|---|---|
| EP | 2257909 B1 | 5/2015 | |
| EP | 2869240 A2 | 5/2015 | |
| EP | 2869240 A2 * | 5/2015 | ........... B07C 5/3422 |
| EP | 2869241 A2 | 5/2015 | |
| EP | 3208744 A1 | 8/2017 | |
| EP | 3249581 A1 | 11/2017 | |
| EP | 3270342 A1 | 1/2018 | |
| EP | 3435287 A2 | 1/2019 | |
| EP | 3514715 A1 | 7/2019 | |
| GB | 2097979 A | 11/1982 | |
| GB | 2482127 A | 1/2012 | |
| JP | 61234481 A | 10/1986 | |
| JP | H07192112 | 7/1995 | |
| JP | 2007213148 A | 8/2007 | |
| KR | 20120009654 A | 2/2012 | |
| WO | 2005086616 A2 | 9/2005 | |
| WO | 2006038114 A1 | 4/2006 | |
| WO | 2007028799 A1 | 3/2007 | |
| WO | 2007031176 A1 | 3/2007 | |
| WO | 2007071788 A1 | 6/2007 | |
| WO | 2007090437 A1 | 8/2007 | |
| WO | 2007144598 A1 | 12/2007 | |
| WO | 2009030853 A1 | 3/2009 | |
| WO | 2009089126 A1 | 7/2009 | |
| WO | 2009115611 A2 | 9/2009 | |
| WO | 2010018464 A2 | 2/2010 | |
| WO | 2010018646 A1 | 2/2010 | |
| WO | 2012145842 A1 | 11/2012 | |
| WO | 2013051019 A1 | 4/2013 | |
| WO | 2013126221 A1 | 8/2013 | |
| WO | 2013173408 A1 | 11/2013 | |
| WO | 2015004434 A1 | 1/2015 | |
| WO | 2016081831 A1 | 5/2016 | |

OTHER PUBLICATIONS

Anonymous, "Intrinsic Characteristics for Authentication" & "Alp Vision Advances Security Through Digital Technology," Authentication News vol. 12, (No. 9) pp. 2, 7 and 8, dated Sep. 2006, 3 pages total.

Bao et al., "Local Feature based Multiple Object Instance Identification using Scale and Rotation Invariant Implicit Shape Model," 12th Asian Conference on Computer Vision, Singapore, Singapore, Nov. 1-5, 2014, pp. 600-614.

Beekhof et al., "Secure Surface Identification Codes," Proceeding of the SPIE 6819: Security Forensics, Steganography, and Watermarking of Multimedia Contents X:68190D, 2008. (12 pages).

Buchanan et al., "Fingerprinting documents and packaging," Nature 436 (7050): 475, 2005.

Cavoukian et al. "Biometric Encryption: Technology for Strong Authentication, Security and Privacy," 2008, WE, Intl. Fed. Iot Info Processing, vol. 261; Policies and Research in Identity Management; pp. 57-77.

Di Paola et al., "An Autonomous Mobile Robotic System for Surveillance of Indoor Environments," International Journal of Advanced Robotic Systems 7(1): 19-26, 2010.

Drew, M. S., et al., "Sharpening from Shadows: Sensor Transforms for Removing Shadows using a Single Image," Color and Imaging Conference, vol. 5, Society for Imaging Science and Technology, 2009, pp. 267-271.

Ebay, "eBay Launches Must-Have IPhone App Red Laser 3.0" published Nov. 18, 2011; https://www.ebayinc.com/stories/news/ebay-launches-must-have-iphone-app-redlaser-30/, downloaded Mar. 21, 2019, 7 pages).

Entropy.com Website History, Wayback Machine; https://web.archive.org/web/20160330060808/https://www.entrupy.com/; Mar. 30, 2016 (Year: 2016), 2 pages.

Extended European Search Report Application No. 21153877.2, dated Jun. 15, 2021, 8 pages.

Extended European Search Report, dated Jun. 18, 2021, for European Application No. 21153355.9, 8 pages.

Farid, "Digital Image Forensics", Dartmouth CS 89/189, Sprint 2013; 199 pages.

Fischler et al., "Random Sample Consensus: A Paradigm for Model Fitting with Applications to Image Analysis and Automated Cartography," Communication of the ACM 24(6); 381-395, 1981.

Huang et al., "A Novel Binarization Algorithm for Ballistic Imaging Systems," 3rd International Congress on Image and Signal Processing, Yantai, China, Oct. 16-18, 2010, pp. 1287-1291.

Huang, et al., "An Online Ballistics Imaging System for Firearm Identification"; 2nd International Conference on Signal Processing Systems, Dalian, China, Jul. 5-7, 2010, vol. 2, pp. 68-72.

Kartik et al., "Security System with Face Recognition, SMS Alert and Embedded Network Video Monitoring Terminal," International Journal of Security, Privacy and Trust Management 2(5):9-19, 2013.

Li, "Image Processing for the Positive Identification of Forensic Ballistics Specimens," Proceedings of the 6th International Conference of Information Fusion, Cairns, Australia, Jul. 8-11, 2003, pp. 1494-1498.

Li, "Firearm Identification System Based on Ballistics Image Processing," Congress on Image and Signal Processing, School of Computer and Information Science, Faculty of Computing, Health and Science Edith Cowan University, Perth, Australia pp. 149-154.

Maddern et al., "Illumination Invariant Imaging: Applications in Robust Vision-based Localization, Mapping and Classification for Autonomous Vehicles," IEEE International Conference on Robotics and Automation, Hong Kong, May 31-Jun. 7, 2014, 8 pages.

Matsumoto et al., "Nano-artifact metrics based on random collapse of resist," Scientific Reports 4:6142, 2014 (5 pages).

Mistry et al., "Comparison of Feature Detection and Matching Approaches: SIFT and SURF," Global Research and Development Journal for Engineering, vol. 2, Issue 4, Mar. 2017, 8 pages.

Online NCOALink® Processing Acknowledgement Form (PAF) Released by Lorton Data, Jun. 2, 2009, URL=http://us.generation-nt.com/online-ncoalink-processingacknowledgement-form-paf-released-by-press-1567191.html, download date Jun. 25, 2010, 2 pages.

Rublee et al., "ORB: an efficient alternative to SIFT or SURF," IEEE International Conference on Computer Vision, Barcelona, Spain, Nov. 6-13, 2011, 8 pages.

Schneider et al., "A Robust Content Based Digital Signature for Image Authentication," Proceeding of the International Conference on Image Processing Lausanne, Switzerland, Sep. 19, 1996, pp. 227-230.

Schwabe Williamson & Wyatt, PC—Listing of Related Cases; dated Sep. 16, 2017; 2 pages.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Shi et al., "Smart Cameras: Fundamentals and Classification," Chapter 2, Belbachir (ed.), Smart Cameras, Springer, New York, New York, USA 2010, pp. 19-34.

Shields, "How To Shop Savvy With Red Laser," published online on Mar. 22, 2010; https://iphone.appstomn.net/reviews/lifesty le/how-to-shop-savvy-with-redlaser /, downloaded Mar. 22, 2010, 8 pages).

Smith, "Fireball: A Forensic Ballistic Imaging System: Proceedings of the 31st Annual International Carnahan Conference on Security Technology," Canberra, Australia, Oct. 15-17, 1997, pp. 64-70.

Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.

United States Postal Service, "NCOALink Systems", http://www.usps.com/ncsc/addressservices/moveupdate/changeaddress.htm, website accessed Jun. 23, 2010, 2 pages.

United States Postal Service, "Postal Addressing Standards," Publication Jul. 28, 2008, 55 pages.

United States Postal Services, NCOALink® Systems, dated May 27, 2009, URL=http://ribbs.usps.gov/ncoalink/ncoalink_print.htm, download date Jun. 23, 2010, 3 pages.

Veena et al., "Automatic Theft Security System (Smart Surveillance Camera)," Computer Science & Information Technology 3:75-87, 2013.

(56) References Cited

OTHER PUBLICATIONS

Woods, "Counterfeit-spotting truth machine launches out of Dumbo," published online on Feb. 11, 2016, downloaded from http://technically/brooklyn/2016/02/11/entrupy-counterfeit-scanner/ on Mar. 20, 2019, 3 pages.

Farid, Ahmed, et al., "Integrated fingerprint verification method using a composite signature-based watermarking technique", Optical Engineering, The Catholic University of America, (Year: 2007), 6 pages.

Jain, Anil K, et al., "Biometric Cryptosystems: Issues and Challenges", Proceedings of the IEEE, IEEE, New York, US, vol. 92, No. 6, Jun. 1, 2004, XP011112757, pp. 948-960.

Truong, Hieu C, et al., "Royal Canadian Mint/Signoptic Technologies Coin DNA Technology", World Money Fair (WMF) Berlin Feb. 1-3, 2011, http://www.amisdeleuro.org/upload/1340734488.pptx, 22 pages.

Zaeri, Naser, "Minutiae-based Fingerprint Extraction and Recognition, 2020 (year 2010)", 47 pages.

* cited by examiner

FLOW DIAGRAM – OWNERSHIP LEDGER

HYPOTHECATION

*FRACTIONAL OWNERSHIP*

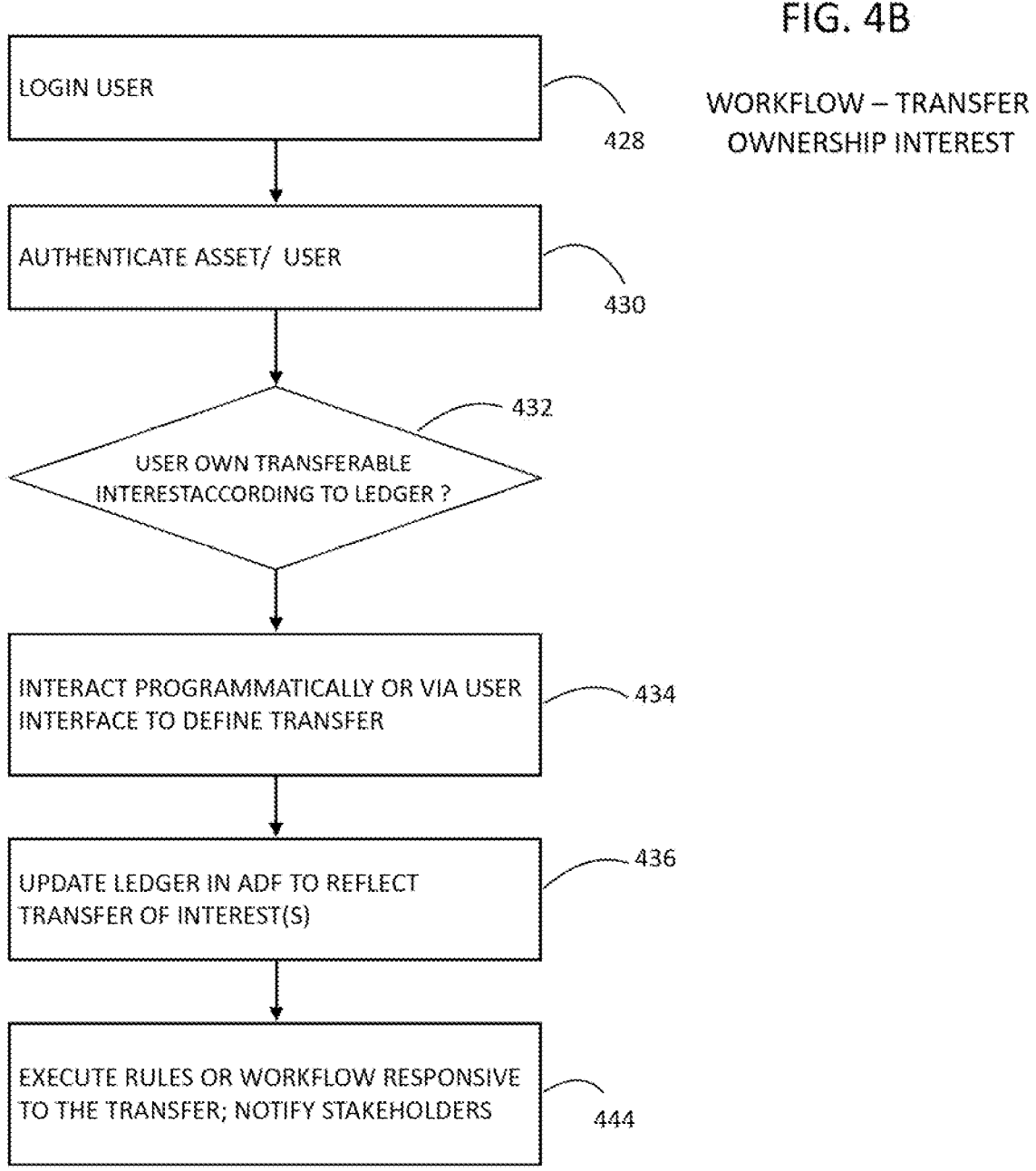

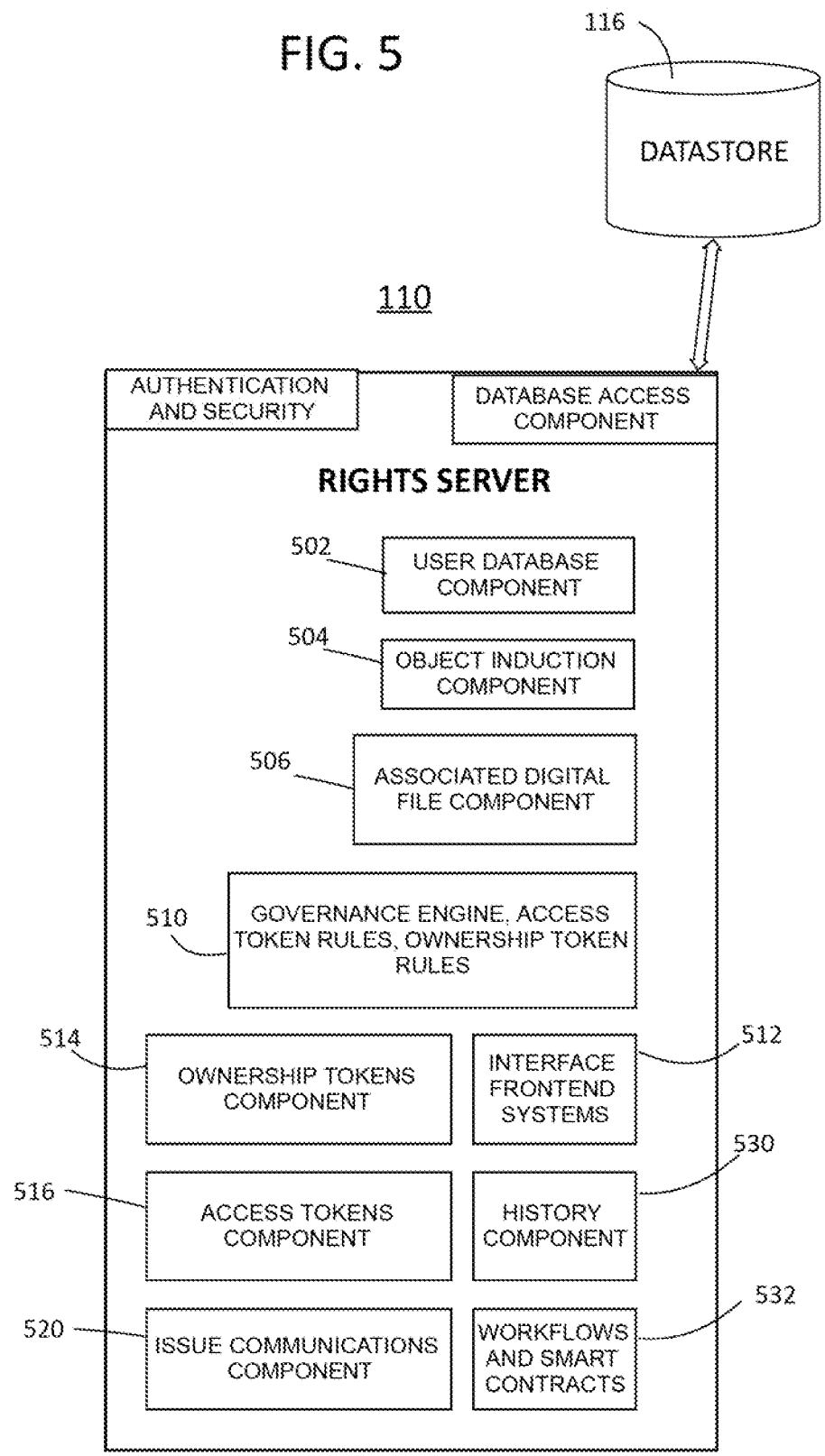

*ACCESS TOKENS*

ASSET-BACKED DIGITAL SECURITY TOKENS

CROSS-REFERENCE TO RELATED APPLICATIONS

This application claims benefit under 35 U.S.C. 119(e) to U.S. 63/040,423, filed Jun. 17, 2020, the contents of which are incorporated herein by reference in its entirety.

COPYRIGHT NOTICE

COPYRIGHT© 2019-2021 Alitheon, Inc. A portion of the disclosure of this document contains material which is subject to copyright protection. The copyright owner has no objection to the facsimile reproduction by anyone of the document or the disclosure, as it appears in the Patent and Trademark Office file or records, but otherwise reserves all copyright rights whatsoever. 37 C.F.R. § 1.71(d) (2017).

TECHNICAL FIELD

This application pertains to methods, systems, and software to create and manage a database storing an associated digital file ("ADF") securely linked to a physical object of value and to implement a high-confidence way to directly prove that the one represents the other. Digital securitized tokens are linked to the physical object and thereby backed by the value of the physical object.

BACKGROUND

Transactions affecting rights in physical objects date back to the beginning of mankind. In a simple example, an exchange of one object for another, e.g. trading some wheat for a spear, transfers ownership in both directions by exchanging physical possession. Later, documents came into use to represent rights in an object indirectly, e.g. a bill of sale or a deed, and security agreements came into use to pledge or hypothecate objects to secure a loan. A pawn shop still secures loans by a possessory lien on a physical object as collateral, but documentation of the loan and lien are still typically necessary.

To make transaction documents in general relatively secure, and thereby reduce fraud and other mischief, things like sealing wax, paper, and electronic notarial seals, digital and electronic signature laws, and watermarks came into use. The problem remains that such things are not truly secure with respect to affected physical objects. Specifically, there is no direct tie between the document (or other token or proxy) and the original object of value; there is no high-confidence way to directly prove that the one represents the other, as such. A need remains for a way to securely facilitate and record various transactions and transfers affecting rights in valuable physical objects in the modern digital world.

Digital currency (digital money, electronic money, or electronic currency) is a type of currency available in digital form (in contrast to physical currency, such as banknotes and coins). Digital currency exhibits properties similar to physical currencies but it has unique properties in enabling instantaneous transactions and borderless transfers-of-ownership. Among digital currencies, virtual currency is digital currency that is used within a specific community. For example, all FarmVille players have access to the in-game virtual currency coins with which they can purchase items for their farm. Virtual currency though is only valid within the specified community. The virtual FarmVille coins cannot, for example, be used to buy a hamburger from a McDonald's restaurant; they have no real-world value.

Cryptocurrency, on the other hand, is digital currency that does have real world value, like Bitcoin. This type of digital currency is based on mathematical algorithms with tokens being transferred electronically over the internet. The actual value, however, is hard to determine and indeed is highly volatile over time. The need remains for value tokens that are backed by real value in a secure, non-repudiable way that enables low-friction but reliable electronic transactions.

SUMMARY OF THE PRESENT DISCLOSURE

The following is a summary of the present disclosure to provide a basic understanding of some features and context. This summary is not intended to identify key or critical elements of the disclosure or to delineate the scope of the disclosure. Its sole purpose is to present some concepts of the present disclosure in simplified form as a prelude to a more detailed description that is presented later.

To begin, the basic construct of a physical object linking to a digital object through the physical object's unspoofable digital fingerprint is applied to enable, facilitate and securely record a valuable physical object (such as a painting) to be tokenized for hypothecation, fractional ownership and other transactions. In general, in this disclosure, transactions affecting physical objects are managed by managing a digital object, namely the digital counterpart record of the physical object.

This disclosure thus describes techniques and their applications for linking the physical world with the digital world through an unspoofable digital fingerprint. Though the term "digital fingerprint" is used as the descriptive term for that link, something quite specific is meant by it that is not generally true about what others call "digital fingerprinting". The digital fingerprints as described by the teachings of this disclosure must characterize a single object, preserve little or no "group" or "class" information, be extractable solely from properties of the object itself, and be repeatable to such a degree that a match between two extractions approaches near-absolute certainty.

In overview, one principal aspect of this disclosure describes dividing a physical object digitally to enable selling, lending, hypothecating, or otherwise conducting transactions affecting a part of (i.e., a partial interest in) the physical object. This is referred to this as fractionalization of an interest in the object. To be clear, the physical object is not literally divided; rather, a legal interest such as ownership or a lien (security interest) is established in a digital counterpart with respect to a portion of the physical object. In some cases, this may correspond to what is called an undivided interest in legal parlance, meaning a partial interest in the whole physical object. In other cases, where an object is physically divisible in some fashion, the digital counterpart records and tokens can be arranged to implement interests in specific parts or subsets of the physical object. Each part may employ its own digital fingerprint. In some cases, a digital fingerprint can represent multiple parts, tokens, etc. through its linkage. Either way, the object doesn't go from one place to another physically; rather, the transaction comprises communicating and processing digital information. In an embodiment, the processing takes place in a rights server, and the transaction is completed in a secure, convenient, yet non-repudiable way, i.e., not able to be repudiated.

In one embodiment, a method to securely implement transactions that affect the legal status of a physical object through digital tokenization of the object, may include: inducting a physical object into a rights management system by acquiring a digital fingerprint of the physical object, creating an associated digital file ("ADF") of the physical object in a secure datastore, and storing the digital fingerprint of the physical object in the ADF, so as to securely and uniquely link the ADF to the physical object in an unspoofable manner; initializing a secure digital ledger stored in or linked to the ADF; generating data comprising at least one ownership token representing initial ownership of the physical object; storing the digital token data in the ledger so that the digital token data is thereby securely and uniquely linked to the physical object; authenticating a user based on receiving a digital fingerprint from the user that matches the digital fingerprint of the physical object stored in the ADF or matches a key object digital fingerprint previously stored in the ADF; granting access to the ADF to the authenticated user; based on input from the authenticated user, updating the ledger to reflect a transfer of a partial interest in the physical object to a second party; and executing a predetermined action responsive to updating the ledger. In sum, the ability to tokenize physical objects securely in part or in whole is given by the teachings of this disclosure. Put another way, tokenization facilitates hypothecation and other transactions.

In an embodiment, a rights server system may include: a digital processor to execute stored program code; a datastore operatively coupled to the digital processor; the datastore arranged to maintain records that form an associated digital file ("ADF") of a physical object, wherein the ADF includes a digital fingerprint of the corresponding physical object; and a communications module or interface for communications with users; wherein the program code is arranged to cause the digital processor, upon execution of the program code, to carry out the steps of: tokenizing a physical object by creating an associated digital file ("ADF") of the physical object, wherein the creation of the ADF is under supervision or control of a trusted entity, which may be understood as a person, legal entity, system or algorithm; securely and uniquely linking the ADF to the physical object by storing in the ADF a digital fingerprint extracted from the physical object itself; storing the linked digital counterpart in a secure datastore; further populating the ADF with data comprising at least one digital token so that the digital token is thereby securely and uniquely linked to the physical object, the digital token representing and specifying an interest (for example, ownership, security interest, access or use rights) in the corresponding physical object; adding supplemental data to the stored ADF, the supplemental data including a transaction ledger; and transferring the digital token to a party pursuant to an agreement; and updating the ledger to reflect the transfer.

In another aspect of this disclosure, a third species is described, namely asset-backed digital security tokens, which are tokens associated or linked to existing or new digital currencies. In an embodiment, a system assigns a value by that association to a digital currency—but the tokens are not themselves digital currency. And they cannot be created or "mined." Rather, the digital tokens are backed by assets (real physical objects) and associated to digital currency as a measure of value. In the method taught by this disclosure, the digital fingerprint provides the unbreakable link between the physical object and the digital one. The uniqueness of the physical object itself is its own identification that can be used for high-confidence authentication.

Extending the concepts presented above on monetizing physical assets, this disclosure further teaches a method that allows any valuable item to become the basis of a digital token backed by that asset. The tokenization approach taught here differs substantially from both known methods of physical currency and/or digital currency. Physical currency can be flat (that is, unbacked by anything with its own value)—like all current national currencies or backed—such as the gold- or silver-backed currencies that characterized national currencies in the past. The stability of such a token comes from the scarcity of the backing asset. The token made possible by the teachings of this disclosure differ from this kind by being digital. Unlike bitcoin and its relatives, this token does not have to depend on artificial scarcity since it is tied through the digital fingerprinting system to objects of real value and scarcity.

The tokens taught herein and their descendants (dividing the total amount owned into smaller pieces convenient for exchange) become the currency. They can, of course, have their own digital analogs including, say, a set of digital fingerprints of the token that can be used a set number of times (or indefinitely) to prove ownership in the object of value. Tokenization may as well be applied to a collection or set of discrete items. A collection may be divided into one or more subsets. Likewise, a "child token" of the collection token may represent such a subset.

BRIEF DESCRIPTION OF THE DRAWINGS

To enable the reader to realize one or more of the above-recited and other advantages and features of the present disclosure, a more particular description follows by reference to specific embodiments thereof which are illustrated in the appended drawings. Understanding that these drawings depict only typical embodiments of the disclosure and are not therefore to be considered limiting of its scope, the present disclosure will be described and explained with additional specificity and detail through the use of the accompanying drawings in which:

FIG. 4B is a simplified flow diagram of an algorithm for transferring a fractional ownership interest of a physical object in a rights management server system.

FIG. 5 is a simplified diagram of representative software components or functions in a rights management server system.

DETAILED DESCRIPTION OF PREFERRED EMBODIMENTS

Figure 1:
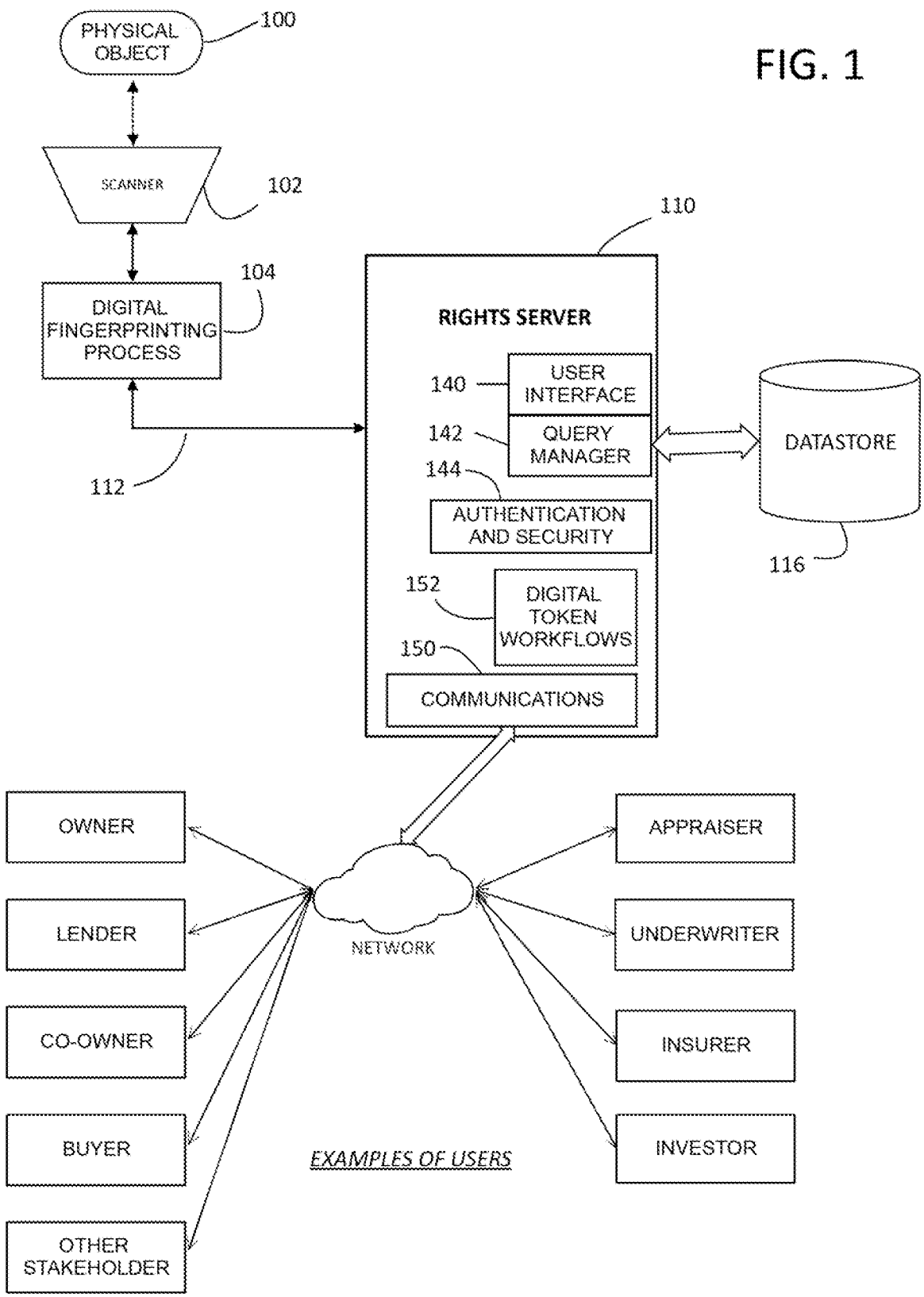
FIG. 1 is a simplified block diagram of one example of a secure digital fingerprint-based rights management system consistent with the present disclosure.

Reference will now be made in detail to embodiments of the inventive concept, examples of which are illustrated in the accompanying drawings. The accompanying drawings are not necessarily drawn to scale. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first machine could be termed a second machine, and, similarly, a second machine could be termed a first machine, without departing from the scope of the inventive concept.

It will be further understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout the various views and drawings. As used herein, the term "and/or" includes any and all combinations of one or more of the associated listed items.

The terminology used in the description of the inventive concept herein is for the purposes of describing illustrative embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed objects. It will be further understood that the terms "comprises" and/or "comprising," when used in this specification, specify the presence of stated features, integers, acts, steps, operations, elements, and/or components, but do not preclude the presence or addition of one or more other features, integers, acts, steps, operations, elements, components, and/or groups thereof.

Nomenclature. Some of the terms used herein have the following meanings or illustrative species. Digital fingerprinting and scanning are described in more detail later.

Originator, Owner or Proprietor—individual or organization who has, is presumed to have, or is shown to have, initial ownership, possession, or control of a physical object and/or is first to cause a physical object to be inducted into the taught system.

System—in some of the embodiments refers to a computer server (Rights Server) and associated datastore arranged to securely facilitate and record various transactions and transfers affecting rights in valuable physical objects.

Physical object—includes any tangible object that is movable.

Key Object—(or Key Physical Object or proxy) is any physical object that can be digitally fingerprinted as described herein and it (or its digital fingerprint) is used for identification or authentication in the context of managing rights in another object or a digital resource.

User—a person or entity who accesses or uses a component of this disclosure.

Associated Digital File ("ADF") is a digital record or digital file associated with a particular physical object. The ADF is securely linked to the actual physical object (and vice versa) by storing digital fingerprints of the physical object.

Rights (affecting a physical object) include, without limitation, whole or partial ownership, and security interests in the object (or in an undivided part of it).

Access rights include rights to access and or use a physical object, a digital resource, or a hybrid combination of the two. A digital resource in this context may be a network service, cloud resources such as processors, storage, a file, a program, a database, or any other digital asset.

Digital Token in general is a digital record or file associated with a particular managed asset, which asset may be digital or physical or a hybrid of the two. A digital token can be used to securely facilitate and record a wide variety of transactions and transfers affecting rights in managed assets.

Ownership/Security Token is a species of digital tokens used to manage ownership and security interests in an asset, including fractional interests.

Access Token is another species of digital token. An access token stores and represents access rights; i.e., a right to access and or use the corresponding asset.

Asset-backed digital security token is a token that is backed by the physical object(s) of value that it is connected to. In one preferred embodiment, that connection is established in a secure server platform.

A system, in one embodiment, may comprise a combination of digital fingerprint authentication techniques, processes, programs, and hardware that facilitate the creation, assignment, management, distribution, enforcement, or any combination thereof, of rights related to a physical object. In some embodiments, the rights arise from or are governed by one or more legal agreements. Central to the system and methods is the creation of a secure digital counterpart of the physical object, which is termed an associated digital file ("ADF").

Spoofing, an increasingly common problem, is the act of disguising a communication from an unknown source as being from a known, trusted source. Spoofing may occur in relation to emails, phone calls, and websites, or can be more technical, such as computer spoofing of an IP address, Address Resolution Protocol (ARP), or Domain Name System (DNS) server. Among the novel features of this disclosure is the unspoofable linkage between a physical object through its digital fingerprints to a corresponding digital counterpart. By contrast, Blockchain-based technologies may be used to create tokens and cryptocurrencies, but they rely on spoofable proxy tags or IDs to connect physical objects to blockchains.

A. Connections Between the Digital and Physical Worlds

Many of the concepts concerning connections between the digital and physical words (but not how to securely connect them) can be found in https://www.wired.com/story/mirrorworld-ar-next-big-tech-platform/. The article discusses in detail a concept that has been gaining attention, namely, the "mirror world", i.e. the universe of "digital twins" of physical objects. In short, the "mirror world" may be viewed as a digital elaboration of the physical world.

Although an excellent introduction to important concepts, the article (and the term "mirror world") gives a limiting description of the objects in the digital world as being "digital twins", copies, or elaborations of particular physical objects. Contrastingly, the concepts and embodiments described herein broaden the range of possible relationships between the two worlds far beyond the concept of a "digital twin". The present disclosure teaches, inter alia, methods of creating secure linkages between any physical object and any digital object through digital fingerprints of the physical object. Once those links are established, the disclosures elaborate on different applications of the approach to accomplish various tasks and/or achieve a broad variety of outcomes.

It should now be clear why the concept of "digital twin" is inadequate for understanding the relationship of a physical object to a digital counterpart in the context of this disclosure. "Digital twin" implies that the digital object resembles in some way the physical one, i.e. it looks like it, contains data about it, or has some other appreciable connection to it. In most of the embodiments described below, the digital counterpart is a file containing information on or relating to a corresponding physical object, but it is not a "digital twin." In particular, one of the novel features of a Digital Counterpart described herein is that it implements one or more novel digital tokens as explained below. Digital tokens can be used to securely facilitate and record a wide variety of transactions and transfers affecting rights in valuable physical objects.

Any physical object that can be digitally fingerprinted reliably and repeatably is in view to utilize the present disclosure. The object must have a material surface or internal structure that is consistent enough from one digital fingerprinting to the next to be reasonably certain beyond a threshold level that the digital fingerprints will unambiguously match. It is not, however, necessary that the surface or internal structure be unaltering. If the object changes only modestly between the times when the digital fingerprints are acquired and if the new digital fingerprints are added to the digital fingerprint record, then such an object is appropriate for the linking discussed here even in the presence of substantial progressive change. See "Preserving Authentication under Item Change," U.S. Patent Application Pub. 2017-0243230 A1, incorporated herein by reference. The remainder of this discussion assumes the physical object may be reliably digitally fingerprinted to fulfill the teachings of this disclosure.

Techniques and their applications are disclosed herein for linking the physical world with the digital world through an unspoofable digital fingerprint. Though the term "digital fingerprint" is used as the descriptive term for that link, something quite specific is meant by it that is not generally true about what others call "digital fingerprinting." The digital fingerprints as utilized herein must characterize a single object, preserve little or no "group" or "class" information, be extractable solely from properties of the object itself, and be repeatable to such a degree that a match between two extractions approaches near-absolute certainty. Some techniques and equipment for digital fingerprinting are described in more detail below.

In general, the digital fingerprint provides an unspoofable link between a physical object (the object being digitally fingerprinted) and a digital object. The digital object is used to initially establish the linked relationship and authenticate it at any later point. In some cases, information about the physical object (other than the digital fingerprint) may be accessed via login without the digital fingerprint. In the present disclosure, the focus is on a particular type of digital object; namely, the associated digital file (ADF) or Digital Counterpart that is linked to the physical object.

B. Digital Tokenization

Tokenization begins with creating a digital counterpart to the physical object of interest. The digital counterpart, or associated digital file (ADF), is linked to the physical object by the digital fingerprint of the object itself. Preferably, the digital fingerprint is stored in or linked to the associated digital file. This is the secure, unspoofable link described above. To access or generate the digital counterpart typically requires possession of the physical object itself.

In one embodiment, a rights server system maintains the digital counterpart files (ADFs) in a secure datastore. To gain access, a user tenders a digital fingerprint, for example, in a user interface or a digital communication with the server. Validation (or authentication) of the digital fingerprint in the server is performed by matching it to a record in the datastore of records corresponding to physical objects previously inducted into the system. The matching process serves to validate the user as well as identify the corresponding digital counterpart file.

A digital counterpart file or associated digital file ("ADF") (these terms may be used interchangeably), contains or is linked to the digital fingerprint of the corresponding physical object as noted. The ADF may contain various additional data, depending on the specific application. Typically, useful contents may include any combination of one or more of the following kinds of digital data. These items are listed by way of examples and not limitation:

- tokens that represent fractional ownership
- high-quality digital photographs of the physical object
- a ledger of current and past owners of the object
- a certificate of origin
- a certificate issued by the most recent professional authenticator
- what is known about the object's provenance
- a ledger of transfers and transactions involving interests represented by digital tokens
- access tokens
- other relevant or desired information or media that can be fixed in digital form.

FIG. 1 is a simplified block diagram of one example of a system consistent with the present disclosure. A physical object 100 may be presented to a scanner 102 to acquire image data. The image data is processed by a process 104 to extract digital fingerprint(s) of the key object 100. These elements may be discrete or integrated. For example, the scanner may be a camera in a smartphone, and the digital fingerprinting process may be an app on the same smartphone. Alternatively, intermediate data (for example, digital image data) may be transmitted over a network to a remote processor to extract a digital fingerprint.

The digital fingerprint of the object is securely communicated to a rights server 110 via path 112. The rights server 110 is operatively coupled to (or includes) a datastore 116. The datastore may contain various databases or tables, including for example customer data and asset data. Asset data may include ADF data described above. The rights server may implement, for example, a user interface 140, query manager 142 for interaction with the datastore 116, an authentication process or application 144. One use of the authentication process may be to identify and or authenticate a physical object 100 based on its digital fingerprint.

The rights server typically may include communications components 150. Shown below in the drawing are some examples of users of such as system. Users may communicate with the system 110 via component 150 to implement a wide variety of transactions related to assets managed by the server system. Users may include, for example, an owner (or the initial owner or proprietor) of an asset; a lender who may make a loan secured by an interest in a managed asset; co-owners of an asset. These may be entities that have acquired a fractional interest in an asset as described herein. Other users may include a buyer of the asset, an appraiser of the asset (who may be issued, for example, a token that grants a limited time access to do an appraisal); and an underwriter.

The term underwriter has two meanings, one in the insurance industry and one in connection with (usually publicly traded) securities. Both may be applicable here. In the insurance scenario, an underwriter may issue insurance to protect an asset managed by the rights server, say to protect it from loss, theft, fire, etc. The rights server may store a rule or workflow which causes it to automatically notify the underwriter of changes to the corresponding ADF affecting the asset. Securities underwriters often work with initial public offerings (IPOs). They asses the investment's risk to determine an appropriate price for an IPO. The underwriter may also agree to buy unsold shares in an offering. In the context of the present disclosure, an asset owner may create fractional shares in a unique asset on the rights server. The type of asset is virtually unlimited, and the number of shares can range anywhere from 1 to millions. The rights server can then manage distribution of shares, payments, and subsequent transfers of the shares, securely and programmatically.

Physically backed gold ETFs, another species of securities, seek to track the spot price of gold. They do this by physically holding gold bullion, bars and coins in a vault on investors' behalf. Each share is worth a proportionate share of one ounce of the gold. The ETF's price will fluctuate based on the value of the gold in the vault. In that scenario, there is no unique physical object identified by its digital fingerprint; rather, the ETF vault stores a fungible supply of gold. So, while the fund is "asset backed," it is quite different from the instant disclosure.

Figure 2:
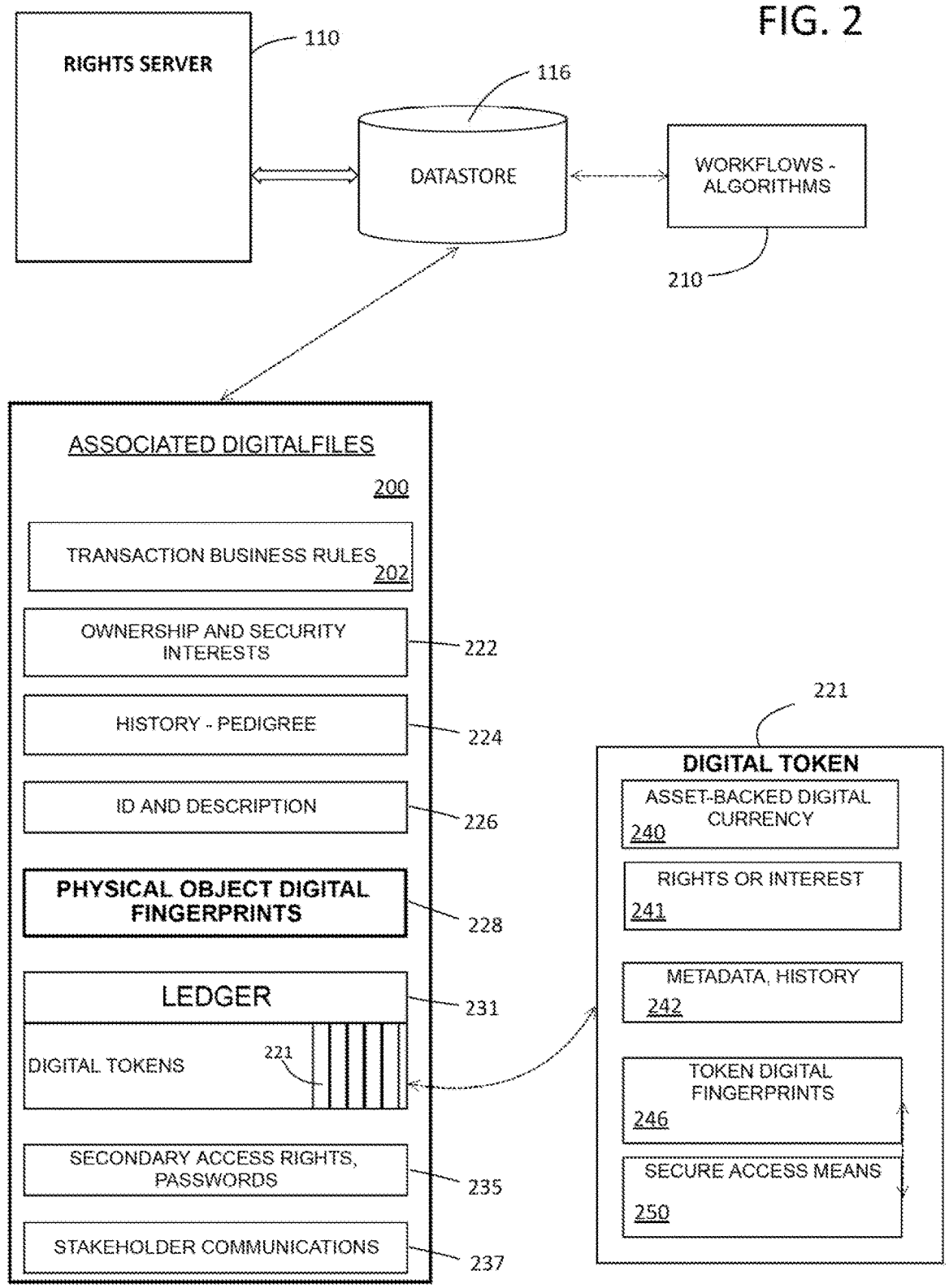
FIG. 2 is a simplified system block diagram including illustration of one example of an associated digital file ("ADF") in a datastore of a rights server system.

FIG. 2 is a simplified system block diagram further including illustration of one example of a digital counterpart or associated digital record (ADF) in a datastore of a rights server system. This example is merely illustrative and not limiting. In the sample ADF record 200, it includes data such as transaction business rules, block 202; ownership and security interests, block 222; history and pedigree data of the physical object, block 224; identification and description of the physical object, block 226; digital fingerprint(s) of the physical object, block 228; and a transaction ledger, block 231.

The ledger 231 may store ownership data, fractional shares, and records of transfers and other transactions. At any given time, the ledger reflects current ownership of the asset corresponding to the ADF 200. Thus, ownership changes and transfers may be effected by updates to the ledger. In some cases, the changes to the ledger may initiated by an authorized user via the communications component, as illustrated in more detail below. In some situations, the ledger may be updated programmatically, as where a borrower defaults on a loan secured by the asset where that security interest is reflected in the ledger. This may be called an "electronic foreclosure."

The transaction ledger 231 may maintain a record of all transactions processed by the rights server that affect or are realized by the creation, deletion, or updating of one or more tokens. This may include ownership tokens and or access tokens. Digital tokens 221 may be attached to the ledger 231. Finally, stakeholder communications data, block 236, by store communications information for the Digital Counterpart 200, including for example, stakeholder email addresses and rules or workflows for transmitting messages to stakeholders in response to various transactions.

Referring again to FIG. 2, one example of a digital token 221 is illustrated in the lower right quadrant of the drawing. This example shows the digital token comprising, in various examples, one or more of asset-backed digital currency, block 240; data defining rights or interests in an object, block 241; metadata such as history data, block 242; token digital fingerprints, block 246; and secure access means, block 250. A dashed line between blocks 246 and 250 indicates that the "secure access means" refers to access to the token digital fingerprints in block 246. These elements are likely to be utilized in connection with managing access rights (via access tokens) as distinguished from ownership interests.

The record 200 may also include data defining secondary access rights and passwords, block 235. And it may store data for stakeholder communications, block 237, such as email addresses and communication logs.

In some embodiments, digital tokens, especially access tokens, may be managed (created, distributed, canceled, updated, etc.) by means of a digital token server. The digital token management server (not shown) preferably is implemented in software, and it may be separate process or integrated with the rights server described above. See the description with regard to FIG. 7 below.

C: Monetization and Fractionalization

In an embodiment, ownership tokens component 514 manages ownership tokens. Preferably, ownership tokens (corresponding to ownership interests) are tracked by a ledger. The ledger may be securely stored as part of the ADF corresponding to the physical object ownership of which is being tracked and managed by the stored tokens. Thus, ownership tokens are not physical objects but rather digital objects that represent interests in a corresponding physical object. (Ownership tokens are distinguished from access tokens, discussed below.) Ownership tokens may be created by a controlling entity or original issuer. As a simple example, an entity may own an original Renoir painting. The owner interacts with a rights server to provide a digital fingerprint of the painting, and the server creates and stores a corresponding ADF, and stores the digital fingerprint of the physical object (the painting) in the ADF, similar to the digital fingerprint 228 shown in the record 200 in FIG. 2.

The owner may define partial ownership tokens as each representing, for example a $\frac{1}{10}$th interest in the painting. This is referred to as fractional ownership. These digital tokens may be stored in or linked to a ledger maintained in or linked to the corresponding ADF. The owner of the Renoir may establish a price for the painting (or for each $\frac{1}{10}$ interest). In that regard, he may submit an appraisal for storage in the record among other metadata. These interests may be auctioned or sold through an e-commerce type of website or front-end process. The governance engine may specify the manner of sale, payment types acceptable, etc. The rights server may then deal with the ownership interests programmatically, enforcing the governance rules and applicable contract terms. In an embodiment, a workflows and smart contracts component 532 may store and implement workflows and smart contracts as applicable.

The ownership tokens have several advantages. First, they may be further bought and sold securely using the rights server. Purchasers may be anonymous. Security is assured because a tendered ownership token (for example, tendered for resale) will be checked by the server against the ledger, and may utilize authentication of the user. Further transactions again may be governed by stored rules, and optionally carried out using stored workflows and or smart contracts, component 532.

Figure 3A:
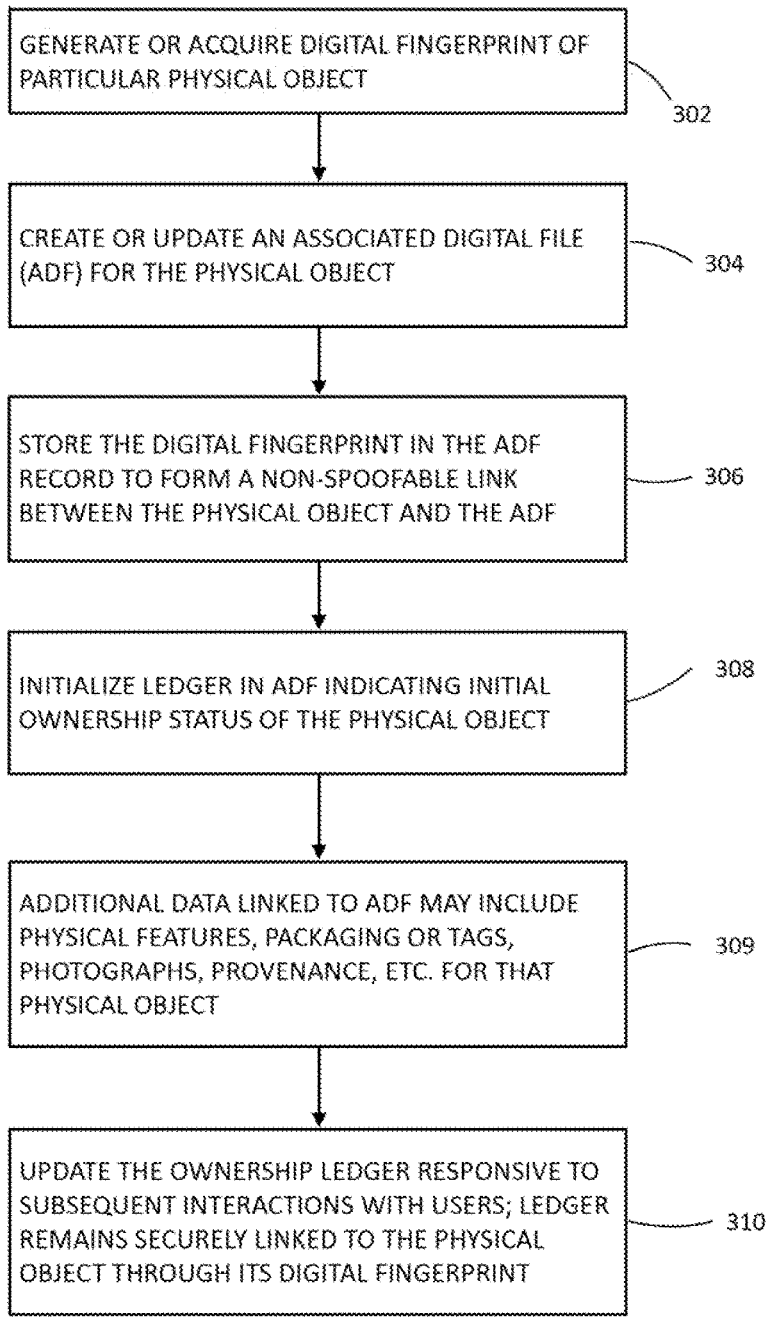
FIG. 3A is a simplified flow diagram of an algorithm for initializing a ledger securely linked by a digital fingerprint to a physical object in a rights management server system.

FIG. 3A is a simplified flow diagram of one process to implement ownership tokenization. Here, the process begins with generating a digital fingerprint of a particular physical object, block 302. To do so, the owner must have physical possession of the object. An image of the object is captured and processed to generate the digital fingerprint. Preferably, a confirmable timestamp is applied when a digital fingerprint is extracted to prevent a person from capturing and storing a digital fingerprint and using it much later. This process may be done in a rights server platform such as 110. Next, the process may create or update an ADF for the physical object, block 304. The digital fingerprint is stored in the ADF to form a non-spoofable link between the physical object and the ADF, block 306.

A next act may comprise initializing a ledger in the ADF and storing in the ledger data, or a token, that specifies initial ownership status of the physical object, block 308. The ledger may take various forms as a digital object, for example, a file, table, database record, etc. Optionally, additional data, generally provided by the owner or proprietor, may be added or linked to the ADF. Such additional data may include metadata for example, physical features of the object, packaging or tags, photographs, provenance information, etc., see block 309. Finally, at block 310, the process should include updating the ownership ledger responsive to subsequent interactions with the server, either by authorized users or programmatically with other resources. The ledger remains securely linked to the subject physical object through the physical object's digital fingerprint.

In one preferred embodiment, ownership tokens created through the digital fingerprint registration (or induction) process are attached to the associated digital record of the physical object as well as the digital fingerprint for accessing the object. Here, the tokens can be used to provide fractional ownership of the object. This method will allow owners of valuable physical objects to create and exchange digital tokens, as shares in valuable physical objects, such as paintings and sculptures, slightly akin to the way stocks of a company are traded today, except that companies are a legal fiction—they have no physical embodiment, and likewise shares of stock are a legal creation having no inherent value. Further, corporate stock trading ledgers and systems do not store digital fingerprints.

In some applications, this fractionalization process may facilitate the "democratization" of ownership of high-value objects. Using the digital fingerprint to register, identify, and authenticate the object provides an approach for high-confidence transactions, without relying on proxy identification and authentication methods that can be spoofed.

Consider an example where an investor purchases a Renoir painting for $10 million, expecting to see it appreciate. The investor may issue digital tokens of ownership based on, for example, a hoped-for $15 million future valuation. The Renoir owner is free to sell these tokens based upon the anticipated valuation of the object (or any value he chooses). Using the digital fingerprint to create and register a unique ID (in an embodiment, an associated digital file of the painting) and then using the digital fingerprint for authentication, means that the Renoir painting purchased cannot be substituted with a forgery and its digital records, such as its provenance records, will always be secure yet discoverable. The issued (sold) tokens are tradeable objects in their own rights, backed by the (hopefully appreciating) value of the Renoir.

The issuer of digital tokens for the digitally fingerprinted object can design smart contracts that can be triggered by events, such as automatic payouts for the sale of the original object. Consider that the Renoir was later sold for $17 million. The outstanding tokens would be repurchased automatically, providing a financial return for the investors or token holders. In more detail, a smart contract associated with the physical object (the painting) may be stored or linked in the associated digital file of the painting. A rights server, suitably programmed, such as described herein, may receive a message from a trusted party reporting the sale. In one embodiment, trusted parties or "message senders" may be specified in the associated digital file. Authentication specifications for such messages may be specified as well.

Responsive to receiving a valid sale report of the painting, the rights server may programmatically take the actions useful to disburse the proceeds or money-like tokens for the proceeds, and notify affected parties, and take any other actions specified in the software. Again, the software implementing the smart contract is secured in the associated digital file by means of the unspoofable digital fingerprint of the physical object, namely the Renoir.

FIG. 4B is a simplified flow diagram of an algorithm for transferring an ownership interest of a physical object in a rights management server system. In this figure, the process shows a user login, block 428, and authentication of the asset/user, block 430. A user login may use authentication by digital fingerprint, password or other means. Either way, a matching record (ADF) will identify the physical object of interest. Decision 432 determines, for example by querying the ledger, whether the user owns a transferable interest in the object. If so, the system acquires data to define a transfer as requested by the user (which may be done by external communications, programmatic interaction with a remote computing object, live user interface, etc.), block 434. Then, the system updates the ledger, block 436, to implement the requested transfer. The transfer may implement update, cancellation, modification, etc. of affected tokens. In the case of ownership tokens (full or partial), the changes may employ little more than updating the ledger. A hypothecation transfer request may employ a more extensive workflow. A transfer of access tokens may involve issuing new access tokens and transmitting them to a designated recipient in the case of access tokens designed to circulate. In general, the server will execute appropriate rules or workflows, block 444 to complete the transfer.

Smart contracts can also be used to enforce rules related to maintenance, transport, insurance, and storage of the digitally fingerprinted objects. Here the digital fingerprint is used to identify and authenticate the physical object when it leaves custody or is transported for any reason, and when it returns. Another area that can be incorporated is taxation.

Smart contracts tied to the tokens and digital fingerprints can execute processes to compute and deduct certain tax schemes, such as withholding tax.

In an embodiment, the present methods may include assigning or associating tokens of ownership of an object to digital fingerprints of other objects. For instance, a token seller can assign a portion of an original painting's tokens to a digital fingerprint of a reprint of the painting. In this example, a buyer that purchases $1,000 of tokens in the Renoir, can hang the reprint of the Renoir in their home and use the reprint's digital fingerprint to access information about the original Renoir in which they have fractional ownership. While the reprint has little inherent value, its digital fingerprint nonetheless is unique and cannot be faked. The reprint thus serves as a secure link to the original and a visual, physical reminder of tokenized ownership in the original. A thief who steals the reprint (perhaps mistaking it for the original) will have no idea of its relationship to the original. Even if the thief somehow learned that a digital fingerprint of the reprint may be of interest, how and where on the reprint to capture a digital fingerprint will be unknown. Even in the unlikely event that the thief knows how to capture the digital fingerprint, a location stamp can be associated with the reprint so that only a digital fingerprint captured at the correct physical location (plus or minus) is valid. This feature can be added as additional security. Alternatively, or in addition, the server system may utilize the digital fingerprint plus other identification methods like a password or biographic ID. The specifications may be specified in the Digital Counterpart of the original Renoir.

In an embodiment, a method also may include options to provide tokenized nested ownership. For instance, an individual may have an art collection that is intended to stay together as a single collection, but the owner may nonetheless sell tokens for individual paintings in the collection. More generally, this process applies to composite objects where certain parts may be worth more than others. For instance, owning tokens for the engine of a classic car but not the entire classic car. A rights server can be programmed to manage the tokens accordingly. In more detail, a token management program can generate, track, update the tokens in a rights server as mentioned above.

In an embodiment, a method may be programmed to provide an index of related or unrelated objects that can be tokenized. Here, for example, the issuer of tokens could create an index for a group of objects, for example a classic car, along with several paintings and sculptures, and then issue tokens for that index. Such an arrangement implements diversification in the investment sense of the term. But at the same time, it ensures that every interest is securely linked to the corresponding set of physical objects. The system can reject an attempt to deal with an individual object beyond parameters specified for the index. Ownership and access rights to such an index can be granted in many ways, including through providing the digital fingerprint of one of the items, of a secondary item (such as the abovementioned painting reproduction), by password, or by other means.

In another application, a method may be programmed to insure objects at different levels of granularity. For example, if someone steals one of 1,000 bars of gold, the insurance company only needs to replace the value of the bar that was stolen. The increased insurance rates would only affect that single bar of gold and its owners, not the owners of other bars. Being able to specify granularity of ownership for an object or set of objects allows owners to set up more differentiated incentive and maintenance schemes that avoid problems with collective ownership, i.e., the tragedy of the commons scenarios. These examples illustrate the versatility of the digital fingerprint method for working with a selected granularity of ownership and providing authentication at that level.

The disclosed methods and systems to tokenize objects for sale, in another embodiment, may be configured to create a private network of owners and/or stakeholders. Token ownership can enable access to the digital record associated with a valuable physical object. A rights server may be used to communicate information to the network of registered owners of tokens corresponding to interests in the physical object. For example, if the original owner of the object wanted to provide options to buy back shares in their object, he could communicate to each token holder on the ledger in the digital folder attached to the digital fingerprint used for registration. In an embodiment, the owner may provide for such communications in the associated digital file. The owner may login (authenticate) to the rights server and initiate the communications. The server may be arranged to receive and process replies from the registered owners. The options may be sold using an associated smart contract. A registered owner may request access to see the contract, while it remains unknown to outsiders.

In an embodiment, a token issuer may not have possession of an object he wishes to register by its digital fingerprint, or the desired object has not been registered by digital fingerprint. Here, the primary purchaser or token issuer can offer a "placeholder digital fingerprint" that will be replaced when he obtains the desired object. For example, a car collector may want to crowdsource funding to acquire a classic car via tokenized, fractional ownership. The collector (i.e., the primary purchaser—token issuer) can provide another digital fingerprinted object as a temporary placeholder, while the tokens are being sold to raise enough money to purchase the classic car. In a similar vein, one may own the Renoir painting, in whole or in part, but it is on loan to a museum. The owner wants to sell a fractional interest in the painting, but it is not accessible to digitally fingerprint it. When the owner lends the painting to the museum (or it otherwise leaves their control), a placeholder digital fingerprint may be created and stored.

Note the placeholder may be a digital fingerprint of virtually any physical object in possession of the collector. (See description of Key Object.) In this scenario, the entire object can be digitally fingerprinted as part of the registration, depending on the specification of the possessor. If and when all the targeted funding is raised, the collector—token issuer must replace the temporary digital fingerprint with the digital fingerprint of the classic car, along with providing all of the appropriate files (such as expert appraisal, provenance, etc.) that should be contained in its associated digital record. In the event appropriate funding was not raised, the collected funds would be returned to the token holders of the temporary object. That process as well can be managed programmatically by the rights server, for example, utilizing ACH transfers.

In another embodiment, a rights server may be configured to create a database of registered, digitally fingerprinted objects. This database can be used to prevent someone from doing again what has already been done or doing something that obviates what has already been done with respect to a previously registered object. Securitization and hypothecation are examples of actions the rights server may prohibit. Consider the Renoir example above; here, the Renoir is registered to a database when tokens were issued. If another party attempted to securitize this same painting via a digital fingerprint-based system, the associated database would find the previously registered painting and prevent any new registration. To that end, the part of the system that creates a digital fingerprint of an object would first check the database of registered objects and that that access would not be under the control of the owner/holder of the object. The database may serve another function, illustrated by a scenario in which a person defaults on a loan or otherwise no longer has unencumbered ownership in an object. He then, without telling the potential purchaser about the default, attempts to sell the physical object. The purchaser can, using the object, access a database telling him all the encumbrances on the object.

In an embodiment, a rights server may auto-generate notices (messages) to one or more rights holders based on a workflow or algorithm triggered in response to receiving an authenticated input message affecting the state of or rights in a tokenized physical asset.

In one embodiment, if the object is a painting, for example, the corresponding ADF puts in one place all that is valuable about the painting except the painting itself. Such a file can, of course, be made without the teachings of this disclosure, but the secure linkage to the object itself established by the teachings of this disclosure cannot be. The following is an example of how the teachings of this disclosure could be used to monetize the painting for the owner. This is but one possible way that digital tokenization can be employed.

D: Using an Object to Secure a Loan

Figure 3B:
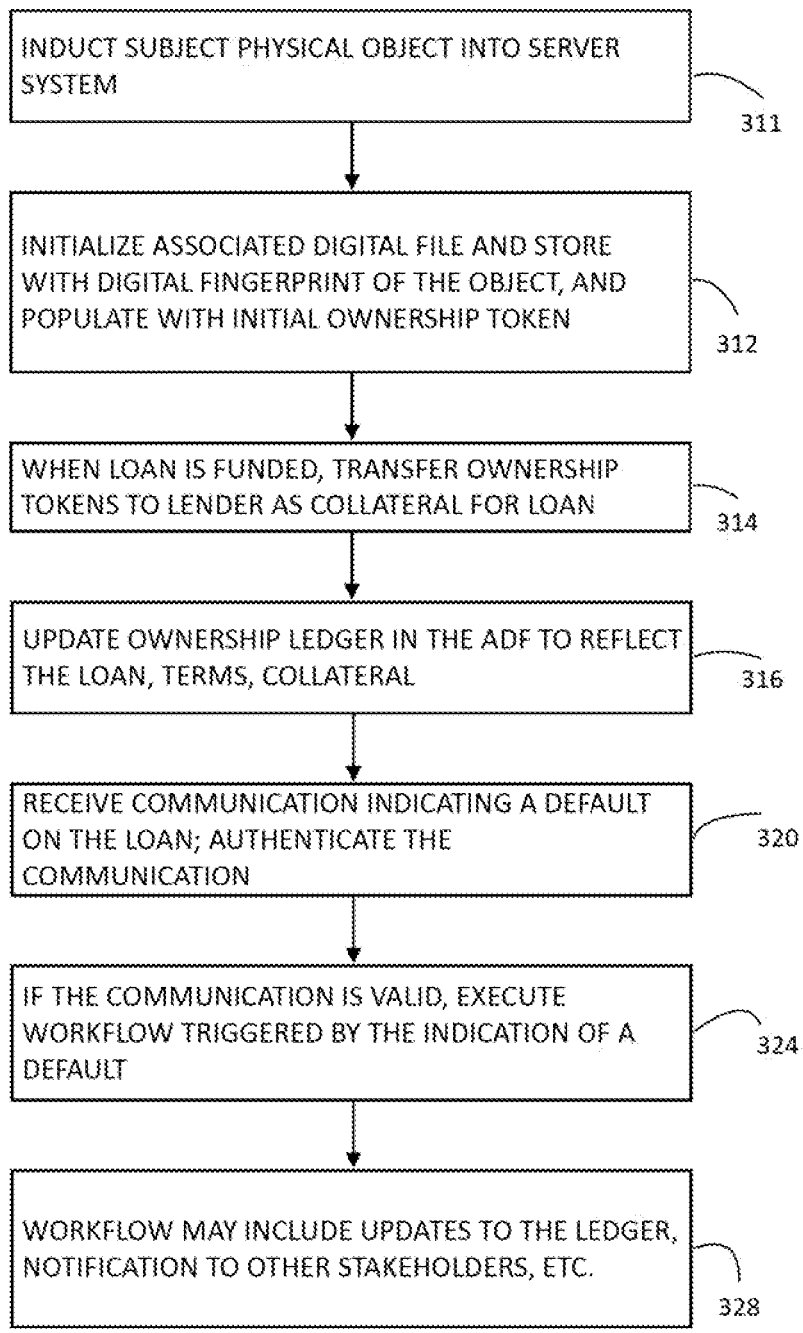
FIG. 3B is a simplified flow diagram of an algorithm for managing hypothecation in a rights server.

One example of a hypothecation process is illustrated in the simplified flow diagram of FIG. 3B. The process may be implemented in a rights server system of the type described herein. To get a $1 million loan, for example, the owner of an object creates (under independent supervision by a company providing the service, for example) the associated digital file and populates it with ownership tokens, see process blocks 311, 312 in the drawing. The ledger is updated to reflect a loan of $1 million on the part of a lender, the terms of the loan, the conditions for repayment, the escrow company if any, and so on—block 316. The loan entry on the secure ledger may include data indicative of by whom and how an indication of default would be received and authenticated by the rights server. In other cases, objects may be loaned, and the loan recorded in the digital counterpart, without any collateral. Where collateral is involved, any object can be used as collateral as long as it is linked by a corresponding digital fingerprint.

The lender may be transferred all or a portion of the ownership tokens associated with the Renoir painting, for example, as collateral when the loan is funded, most likely through a third party, block 314. Put another way, full or partial (fractional) ownership interests may be hypothecated using the present system. Hypothecation is accomplished in essentially the same way that fractional ownership is, except that the ownership rights given by the tokens here are provisional—on the loan being defaulted on—instead of absolute. The transfer of collateral may be accomplished by updating a ledger in or linked to the digital file associated with the painting (block 316). Put another way, the transfer of collateral may be realized by assigning provisional or contingent (on default on the loan) ownership interests to the lender. An access token (a physical object) may be transferred to the lender. But if the associated digital file is in the possession of a secure intermediary, for example, a secure rights server, nothing needs to be transferred to the lender other than access to the file that shows his security interest in the object.

If the owner defaults on the loan, block 320, the lender gets ownership of a previously-agreed-to portion of the painting and its associated digital file. Transfer of ownership rights may be implemented by a workflow, block 324, triggered by the indication of a default. (See discussion of non-judicial foreclosure below.) The workflow may change the collateral status of the subject token(s) to an ownership status in the corresponding ledger. The workflow may notify other stakeholders. The "portion of the painting" refers not to a literal, physical portion of the painting; rather, it refers to an undivided partial-ownership (or fractional) interest. This new ownership interest is securely documented by a corresponding transfer of rights in the associated digital file, for example, by updating a ledger.

Depending on the terms of the above loan agreement, during the term of the loan, i.e., in the absence of a default, the lender can sell his share or do many other things that could be included in associated smart contracts. For example, the lender can sell, hypothecate, fractionalize, etc. the loan (his rights as lender); including the security interest if there be one in collateral securing the loan.

In sum, there are at least four scenarios that individually or in various combinations can all be securely implemented using the systems and methods described herein to make them convenient, non-spoofable, non-repudiable, and is some cases largely automated. These scenarios include (fractionally) selling an ownership right, (fractionally) hypothecating an ownership right, (fractionally) selling the rights of a lender, and (fractionally) hypothecating the rights of a lender.

In a further elaboration of this embodiment, the owner of a portion of the object may sell, or otherwise leverage, hypothecate, etc. his partial ownership interest, in part or in whole. Thus the (partial) owner may have the right, given as part of the contractual agreements that form part of the digital counterpart, to redistribute his tokens or to subdivide his ownership and to issue new tokens (whether digital, physical, or a combination) to those who purchase (or borrow or lend against or otherwise acquire an interest of some sort) his part of the object. Likewise, an owner of a partial interest in a loan (as lender) can sell or (further) fractionalize and or (partially) hypothecate his rights as a lender.

The end result of the foregoing process is that the physical object is connected or linked—through its digital fingerprint—to a digital object (here, the associated file) containing information on ownership, repossession and/or other agreements, management of the tokens (and their digital fingerprints) as well as any additional information and metadata on the object itself. Some examples of metadata were given above. In an embodiment, management of ownership and or access tokens may be governed by a set of business rules (See 202 in FIG. 2, illustrated as part of an ADF 200).

A rights system as described herein may programmatically "foreclose" on the collateral by changing the security interest to an ownership interest and updating the corresponding ledger to reflect that change. A secured creditor may repossess a piece of collateral or render a piece of equipment unusable on the debtor's premises through self-help and without judicial process, where the creditor's lien extends to 100% interest in the asset, pursuant to applicable law, such as Section 9-609(b)(2) of the Uniform Commercial Code. Self-help repossession is the easiest, quickest and most cost-effective means of repossessing collateral as it does not require the time and expense of obtaining a court order. The system disclosed herein may then issue updated digital tokens reflecting the change to affected parties. These processes or workflows implement programmatic non-judicial foreclosure.

An embodiment may also include scenarios around rehypothecation. For instance, lending entities that hold securitized tokens of objects, may use those same tokens as collateral for their own purposes. (The entity need not literally "hold" the tokens; ownership of the tokens may be registered to it in a ledger in a centralized server system.) In the previous example, the lender who accepted $1 million in tokens for the Renoir painting may use these same tokens as collateral on a separate transaction. The digital nature of the tokens renders the tokens easily trackable and enhance the lender's liquidity options.

E: Partial Sales and Fractionalization

Tokenization to implement partial ownership shares was described above. Many objects of value, such as paintings, or diamond rings, are by their nature, indivisible (in the physical sense). Partial, undivided interests in assets are well-known in many legal systems; for example, undivided partial interests in real estate or other assets (co-tenancy, for example). The present system enables a variety of transfers and transactions, including creating and transfer of partial interests, in a low-cost, secure "spoofproof" system. The present system enables secure, convenient investments in fractional shares of almost any physical object.

Figure 4A:
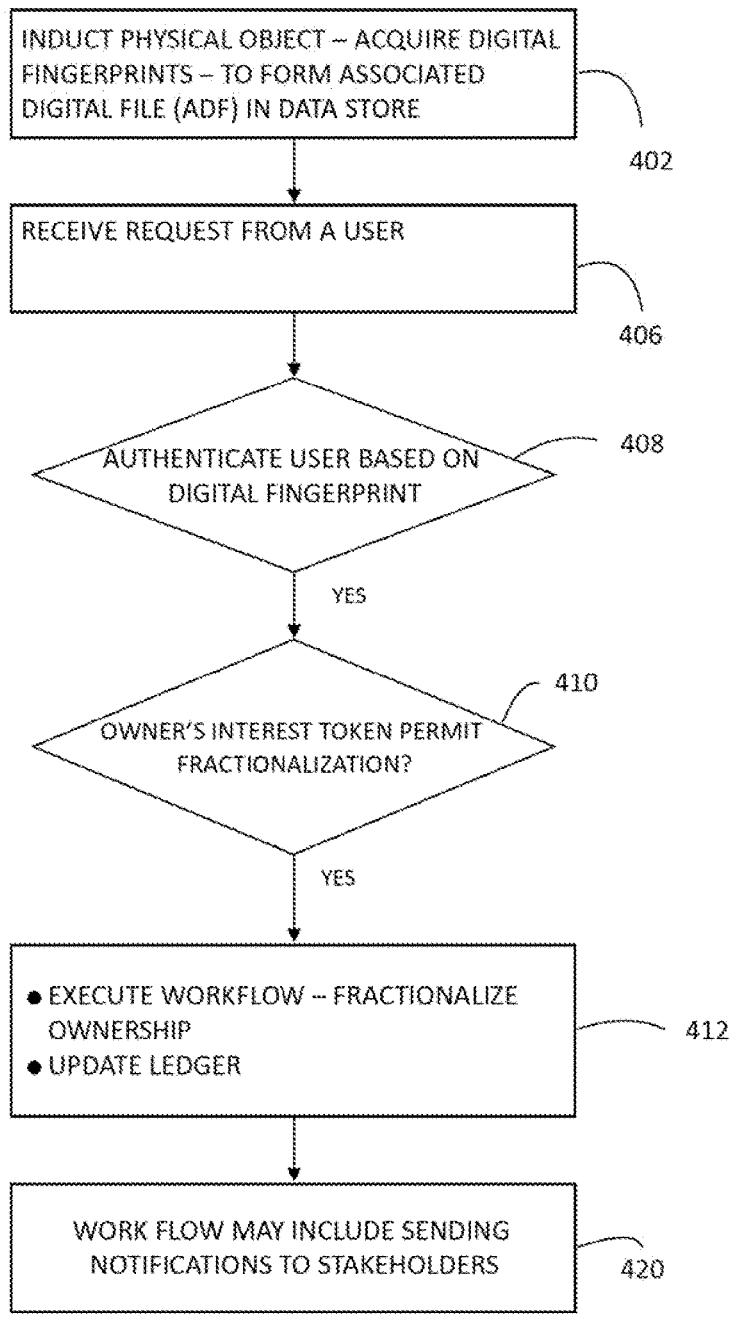
FIG. 4A is a simplified flow diagram of an algorithm for creating a fractional ownership interest of a physical object in a rights management server system.

FIG. 4A is a simplified flow diagram illustrating one example process to implement fractionalization of an object. The physical object of interest is first inducted by acquiring a digital fingerprint of the object, and an ADF is created and stored as described above. The digital fingerprint is stored in the ADF in a datastore, block 402. A request is received from a user to fractionalize his share, block 406. The user is authenticated, or more precisely a digital fingerprint tendered by the user is authenticated, decision block 408. Assuming a matching record (ADF) is found, the system determines whether the user's interest permits fractionalization, decision block 410. This may be determined, for example, by terms stored in the ADF, or associated business rules, or workflows accessed by the server.

If the user is authorized and the action is authorized, a workflow may be executed to fractionalize ownership as requested, block 412. The ADF ledger is updated to reflect the change. The user request typically would specify the fractional shares, which need not be equal, and associated terms and conditions. The workflow may include sending notification to fractional owners and or other stakeholders, block 420. In one example, where the ledger shows the user's interest has been hypothecated, the new fractional interests will likewise be created subject to the lien and inherit the relevant terms. This data should be added to (stored in) each new fractional interest token. The original owner may specify recipients of some or all of the new fractional shares. Such allocations can also be done automatically as part of applicable work rules, for example. This data is added to the ledger as well; it may be used to transmit notifications to the recipients of the new fractional shares.

FIG. 5 is a simplified conceptual diagram illustrating principal software functions and components of one embodiment of a rights server. In the figure, a rights server 110 provides the functions described below. Although sample software components are shown for illustration, the organization or allocation of various features and functions to specific software components is a matter of design choice. Indeed, some of the functionality illustrated may be implemented in a separate server or database arranged for communication and coordination with the rights server 110. As one example, in some embodiments, the rights server 110 may query a central server (not shown) during the object induction process (component 504), to check that a physical object digital fingerprint not only is not already found in the datastore 116, but also to confirm that it is not already registered in the central server. This ensures that the same object is not being managed in a different system, or at least is not being managed in parallel in a manner that would conflict with the uses described herein. There may be a scenario where a first portion of ownership of an asset is managed in a first system or rights server, while a second portion or share non-overlapping the first portion is managed in a second system.

In the example rights server system of FIG. 5, a user database component 502 may issue and maintain the identity of a user (creates user profile, not always necessary). User data may be stored in a user database in the datastore 116. Types of users may include, for example:

(a) Controlling entity or original issuer (this refers to an entity that controls use and or ownership of a physical object inducted in the system, for example the entity that originally entered the physical object into the system (via its digital fingerprint)); (b) Entity who wants access and/or use of an object. (in this sense, the object may be physical, for example, a car or lawnmower that an entity wants to use (temporarily), or the object may be a software file, object or service); (c) Entity who wants to purchase fractional ownership of the object, and/or (d) Entity that wants to hold some share of ownership in the object (e.g., ere the entity would "hold" an ownership share in the sense of hypothecation).

The user database component may authenticate the user profile via biometric or other means. User data may connect bank account or other means to buy or exchange via the present system. The user database component may issue access passwords or connect to another digital fingerprint's access token.

An object induction component 504 manages induction of a physical object into a repository or datastore coupled to the system. Component 504 may receive an induction request. The request may comprise a message communicated over a network or interaction with a user interface. The induction request may include a digital fingerprint of the physical object. Alternatively, component 504 may manage creation of the digital fingerprint, for example, using the scanner 102 and associated elements illustrated in FIG. 1 or equivalents. In an embodiment, the induction component 504 may check to see if the object has already been inducted. This may be done by querying a database of counterpart records based on the digital fingerprint. The induction component, to induct a new object, may create an associated digital file and store the file as or in a record in a database, for example, in datastore 116. It also stores the digital fingerprint of the physical object in the ADR as discussed above. This induction component 504 may receive various additional data or metadata and associate it to the physical object by storing the data in the counterpart record. In an embodiment, these acts may be realized by a digital counterpart component 506.

Key Object. In some embodiments, the induction process may include generating or otherwise acquiring a digital fingerprint of a different physical object, called the key object. The key object is not the physical object being inducted, which may be called the managed object. The key object digital fingerprint may be stored in the ADF of the managed object along with the digital fingerprint of the managed object. The key object may then be used to grant to its holder access to the protected asset. Key object digital fingerprints may also be added to the ADF subsequent to initial induction, subject to proper authentication and permissions.

In more detail, a user may tender a digital fingerprint of the key object via a user interface or communication with the rights server. The server then queries the datastore for a match, and if successful, grants access to the physical object associated with the matching record. What access is granted via the key object may be defined in the ADF or by associated governing rules and or workflows. That access may be defined to obtain certain access tokens, or to obtain a certain share of ownership tokens. In this way, various rights in the managed asset may be transferred securely by delivery of the key object or the digital fingerprint of the key object, or a token representing the key object, to a transferee.

In an embodiment, the induction component 504 or the ADF component 506 additionally may implement one or more of the following acts or processes: Collect and add additional information to the counterpart record for the digital object as need (metadata, user-input, images, media, or other means of data ingestion); Establish a pedigree for the physical object; Create an ownership ledger (see below); and Induct prior certifications and contracts as needed. Some of these data elements are illustrated in FIG. 2, ADF 200.

Referring again to FIG. 5, a governance engine 510 may be provided to store and implement access token rules and ownership token rules. These rules may be established by the controlling entity or original issuer. They may be acquired in the object induction process or subsequently. This component 510 thus enables a controlling entity to define rules that govern rights associated to accessing and/or using the corresponding object. Further, this component enables a controlling entity to define ownership terms that govern the interests or shares sold via ownership tokens.

Another component 512 may be provided to coordinate with frontend systems, for example, frontend systems that are used to market items to buyers (for example, external websites or apps). This may exchange data via APIs or other means. These marketed items may comprise, for example, access rights or ownership rights in an object.

F: Additional Example Embodiments and Applications

Securing a Supply Chain. In one preferred embodiment, the digital record is a file relevant to a particular physical object and the digital fingerprint for accessing the file comes from the physical object. (In some other applications, the object whose digital fingerprint provides access to the digital file may have nothing at all to do with the contents or functionality of the digital file (other than its being accessed through the digital fingerprint)).

The physical object's digital fingerprint is captured at a point of known provenance. That may be the time and place of manufacture, repair, or expert appraisal, to give a few examples. That digital fingerprint of the object is associated with a digital file about the physical object (ADF) that stores data comprising, for example, where and when it was produced, where it has been and where it was going, and anything else needed for tracking the object. In this embodiment, the digital fingerprint comes from the object and is captured each time information about the object has been generated or existing information needs to be used. The digital file contains this information. It is securely and uniquely linked to the physical object by storing the digital fingerprint of the object in or linked to the digital file.

In this embodiment, the digital file and the physical object are linked at known provenance, and the file is thenceforward protected by standard digital techniques while the associated physical object itself continues along the supply chain. At any point the physical object can be digitally fingerprinted again, and that digital fingerprint compared to the one associated with the file. If it matches properly, the object is deemed authentic. What has happened here is that because of the unspoofable link between the physical object and the associated digital file through the digital fingerprint, the physical object participates in the security features of the digital realm. Without the link, security of the object depends entirely on security of the supply chain. With the link, either the object or the file being kept secure is sufficient to know the object is authentic. Single points of failure have been eliminated.

In this type of scenario, an object is taken out of the possession or control of the owner/original holder. There is thus no security in the flow of the physical object, but the file containing identifying and ownership information remains secure and through the digital fingerprint (captured at registration and used at return of the object), the object itself remains secure. It is positively re-identified as the original object registered earlier.

Meta-analysis of tokenized digitally fingerprinted objects. In one preferred embodiment, the system or platform that facilitates the keeping of records of tokens assigned to the digitally fingerprinted objects can use object-specific information to aggregate information about the value of objects and their classes. Data generated can provide details such as price trends, forecasting of future value. For example, the platform used to track tokens of classic cars can aggregate information about the change in value of specific classes of cars, thereby providing pricing trends.

G: Access Tokens Distinguished from Ownership Tokens

As discussed above, a rights server system may manage access tokens as well as ownership tokens. It was explained above that "access token" refers to a digital record or file associated with a particular asset, which asset may be digital or physical or a hybrid of the two. A hybrid asset may comprise, for example, a machine (physical object) and a user manual or maintenance records (digital files) associated with the machine. Access to both of them may be managed by a digital access token. A digital token in general stores and represents an interest in or right to use a corresponding asset. An access token more specifically grants the holder specified rights to use or access an asset, rather than own it.

Figure 6:
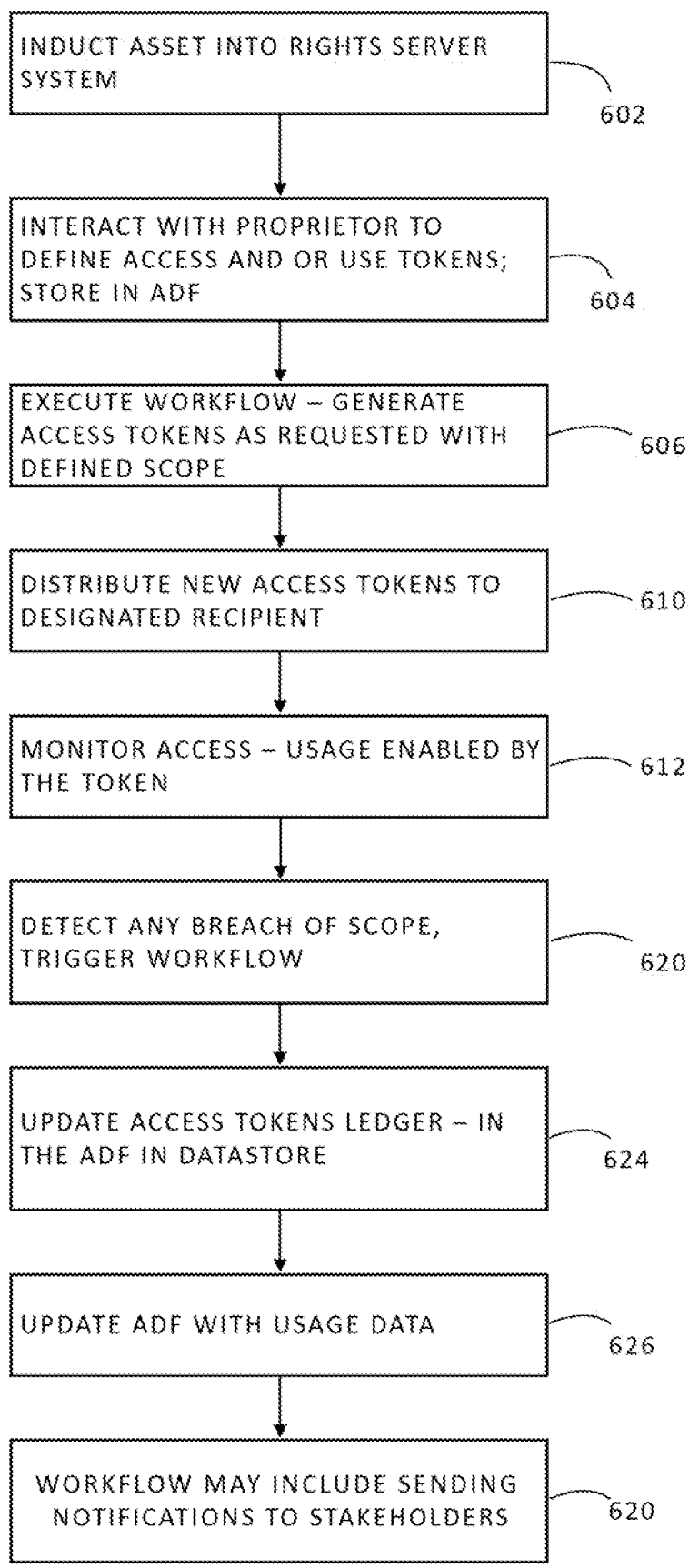
FIG. 6 is a simplified flow diagram of an algorithm for managing access tokens in a rights management server system.

FIG. 6 is a simplified flow diagram of an example algorithm for managing access tokens and corresponding rights in a rights management server system. The process comprises inducting an asset into a rights server system, block 602. This asset, as noted above, may be a physical object, a digital object, or a hybrid of the two. The system interacts with a proprietor to define access and or use tokens, block 604 and stores them in the corresponding ADF. Next, the system may execute a workflow to generate access tokens as requested with defined scope, block 606. The scope may define a type of use or access, duration of use or access, etc. In one example, a classic car may be hypothecated using the ownership tokens, but the owner may also sell access rights for other parties to drive the car (assuming it does not breach the loan security agreement). Access parameters may limit the usage to say 100 miles, or 50 miles per day, or a permitted geographic region of operation.

Continuing, the system may distribute the new access tokens to a designated recipient, block 610. When the recipient utilizes the token to access or use the corresponding asset, the system may begin to monitor that access or usage, block 612. Examples of practical systems and processes to accomplish that monitoring are described below with regard to FIG. 7. The monitoring detects any usage of the asset beyond the permitted scope, block 620. Such a breach may trigger a workflow to address the breach, for example, disabling the asset or assessing a surcharge. Next, the access tokens ledger is updated to reflect the usage, block 626, which may be stored in the corresponding ADF in a datastore. Finally, a workflow may include sending notifications to stakeholders, see block 630.

Figure 7:
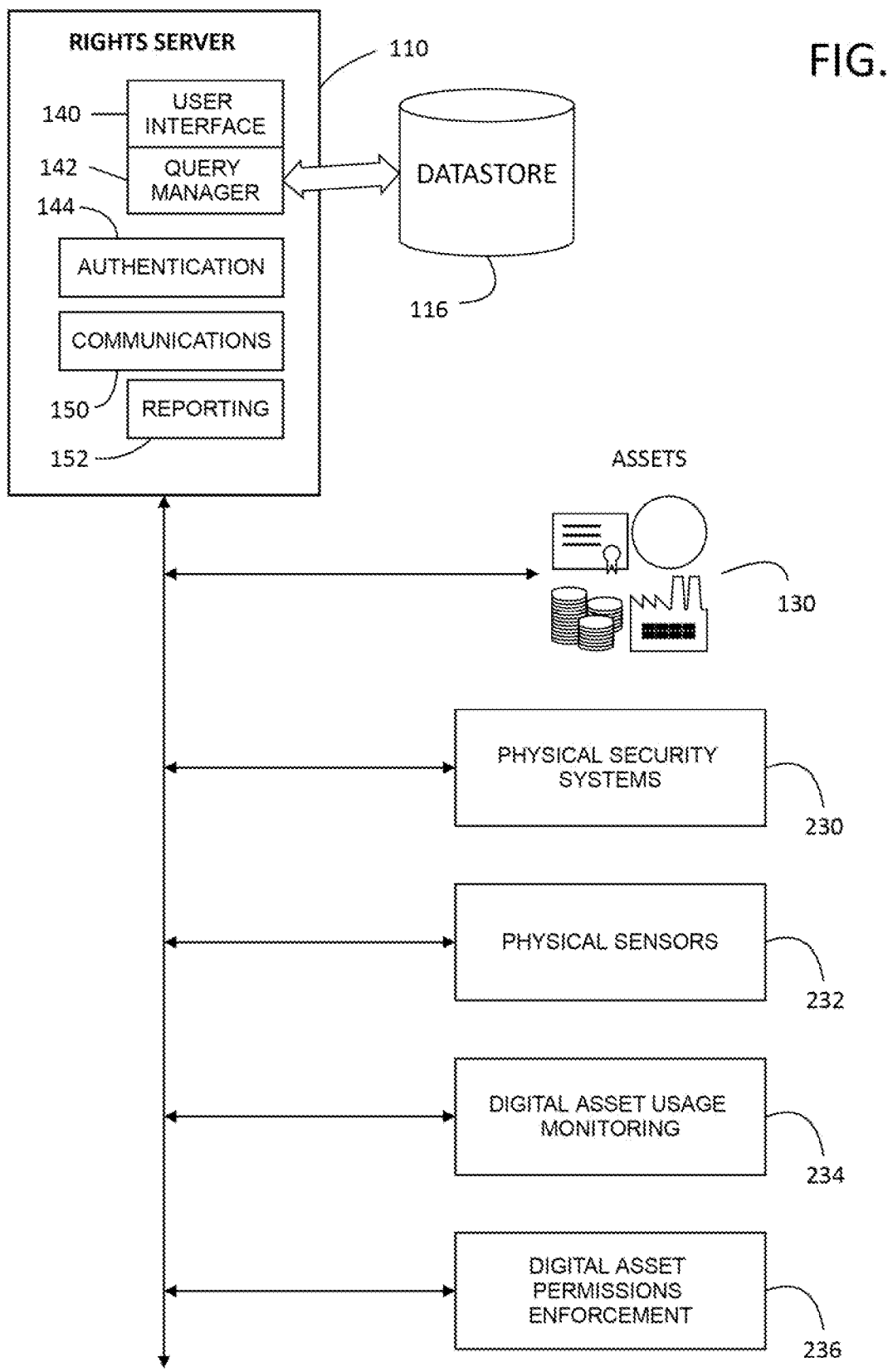
FIG. 7 is a simplified system block diagram to illustrate examples of rights server communications with various internal and external equipment and processes.

In the parent case, rights management is described using digital fingerprints. Much of that case focused on access and use rights—rights that may be implemented and managed using access tokens as described above. The managed objects are referred to as "protected assets." The rights server system and methods described above may be arranged to provide much of the functionality described in the parent case, through the use of access tokens. The functionality of the parent case may also be implemented in a separate DRM platform configured for communications with the server system described above, or some hybrid arrangement. In that scenario, for example, some access tokens issued by the above system may be configured to point or link to the DRM platform to realize the functions described below with regard to FIG. 7. Drawing FIG. 7 is a reproduction of FIG. 2 from the parent case. Selected portions of the parent case specification are reproduced below.

FIG. 7 is a simplified block diagram of a system. It illustrates rights server 110 communications with some examples of internal and or external hardware and software elements to realize the server functionality. The examples shown are merely illustrative and not intended to be exhaustive. Communication with assets 130 illustrates cases where the protected assets, physical, digital, or hybrid, may have the ability to communicate directly with the server. For a digital asset such as a program, this may take the form of inter-process communications. The asset may be a "player" that controls use of a digital media content items (themselves also assets); it may interact with the server to enforce restrictions and or report usage of the media items.

The rights server may communicate with physical security systems, block 230, such as those mentioned above. The physical security systems 230 in turn are coupled to corresponding assets via link 240. The rights server may communicate with physical sensors, block 232. For example, sensors to monitor the environment around a loaned asset. The physical sensors 232 thus are coupled to or arranged adjacent to assets 130. A sensitive item of laboratory equipment, for example, may have a limited temperature operating range to maintain calibration. Or, accelerometers may be utilized to ensure an asset is not "shaken" beyond limitations specified in the applicable use terms and conditions. These kinds of features may be useful where a physical asset is released to a user for the express purpose of transporting the asset to a new location, subject to limited vibration and temperature swings.

In one embodiment, the taught system is used for data and digital content distribution and discrimination. This method provides a convenient and secure way to distribute data and/or other digital content with such control exercised through the digital fingerprints of one or more physical key objects. This allows the lender to deliver information to a dynamically changing set of users in such a way that only authorized users can gain access. Further, the permissions and usage agreements can vary on a per-object or per-user basis. This embodiment may include access to copyrighted material, streaming audio/video, etc.

Referring again to FIG. 7, a rights server may communicate with digital asset usage monitoring systems or components 234. The monitoring system may communicate with a customer or user system (not shown) that is accessing or utilizing the protected digital asset. The rights server may communicate with components arranged to enforce digital asset permissions, block 236, for example by changing permissions to deauthorize or stop access to an asset after the permitted usage limit is reached. In an embodiment, an alarm process or workflow may be triggered when usage of an asset exceeds the applicable management parameters. Interaction with and control of hybrid assets, or associated data collection, may be realized using one or more of the components illustrated in FIG. 7.

In one embodiment, the disclosed control of a digital object through a physical object permits object owners or producers to bundle offerings, such as digital offerings that complement or in some manner relate to the use of the physical object. In one such embodiment, the object originator ties proprietary tutorials and instructions to a piece of equipment. A digital fingerprint is used to authenticate the physical object and access the rights management server that grants access to the tutorials and instructions.

The taught system may deny access to customers based upon rights or licenses with other customers or polices dictated by the laws or by the originator. Although a customer may scan an object (or otherwise obtain and/or reference the object's digital fingerprint) in hopes of taking possession of that object, the rights management server and any connected security or governing systems may deny the customer that possession based upon licenses or procedures in the rights management server. Here, the digital fingerprint is used to identify the individual physical object and initiate the transaction and the tracking of rights. Digital fingerprints may also identify the user—these may be key object digital fingerprints or even the user's or proprietor's own biometric digital fingerprint.

H. Asset-Backed Digital Security Tokens

Above tokenizing is described as an asset, say an original Renoir, and creating say 100 tokens for $\frac{1}{100}$ ownership interest per each. Those tokens can be bought and sold, and further divided, pledged, etc.—all the while (proportionately) backed by the original Renoir. If a group of people are circulating those Renoir tokens, it might be considered a "digital currency." There are known domain-specific digital currencies, for example, for games like Farmville coins. They are only accepted (negotiable) in the Farmland game domain. By contrast, in the above example, the Renoir digital currency can be used for anything. It is not a fiat or national currency. The Renoir asset-backed digital (security) token is just that—a digital currency backed by that one specific asset. Further, the asset-backed tokens can be linked or associated to a currency. Unlike domain "currencies" or fiat currencies, it is reliably linked to real value in a physical object. Ownership and transfers of tokens may be implemented and tracked, for example, in a server system as described above.

Value is assigned as in any sale/attempted sale: it may be set by auction, set directly by the seller (the "ask" price in stocks, for example), set differently by the buyer(s)—the "bid" price in stocks, or by any other means. Of course, once a token sells, the price has been established as mutually agreeable to buyer and seller.

The token value may be expressed in terms of a linked currency. Generally, this is similar to transactions involving a physical object. If the token is intended to be exchanged on its own or is intended to help establish a valuation for the object, then it may be denominated in some currency (e.g. dollars). If, however, it merely is a holding place for ownership (for example, I own one tenth of that painting and will get 1/10 of the sales price when the thing is sold), it need not be valued at this time. The ownership claim provided by the token and the valuation of the token are therefore related but not the same thing.

The real value of the token(s) will vary with the value of the linked physical object itself. If valued in a currency, it may also have that variation. To illustrate: I can contractually sell or pledge to you a 1/10th interest in my house. Although you could have an appraisal performed, the value of that ownership doesn't change because you do so (you merely now have an estimate of its potential value where you didn't beforehand). On the other hand, I could have a hoard of 10,000 $100 bills and sell you a 1/10000 interest in that hoard. That valuation is obviously going to be very close to $100.

A preferred system tracks all this as usual in the rights server. Tokenization is a way to make the asset frangible. That is one of its primary advantages—making an indivisible item divisible. It, of course, has all the security features, tracking abilities, etc. described above, but in principle whatever one wants to do with that piece of the asset that was allowed when the token was produced (or added since then), one can do. What exactly one does may take many different forms, including lending one's share, selling one's share, hypothecating one's share, and so on.

The tokens in some practical applications may be likened to a currency backed by the asset. As with any "currency" people can choose not to take it. But were such a tokenization system in widespread use, they might take a fractional share in a house or a Matisse as payment on a credit card bill. Who will take the token for what depends on establishing an objective value for the token—in this case a fraction of the ownership of a Matisse of a given assessed valuation stored in this secure place, etc.

As another illustration, I (as the owner) induct a cruise ship or an island worth $100 million into the secure digital fingerprint-based server system. (Although the present coronavirus may have devalued cruise ships substantially.) I generate one million tokens valued at $100 each. Then, I register users, and I ledger one token to each user who pays $100 (or multiples thereof).

The island has an assessed and agreed-upon value of $100 million. One million tokens are generated (and the right to produce more is given up, either contractually or by other means). When someone purchases a token, the secure ledger is updated. It is probably updated with information about the purchaser, about the token, and—in some embodiments—with the digital fingerprint of some other object that is the proof that the purchaser is the legitimate owner of the token. Think of this latter as securely creating a physical bitcoin or, for that matter, a fiat currency bill. The physical object is the coin, the token plus ledger is the record keeping on who owns what, who has lent what, and so on, and the island is the store of value backing the "currency". Think of the physical object held by the purchaser as the "body" of the valuation and the token as its immaterial but irrevocably linked "soul". The token and the link to the digital fingerprint of the physical object are what connects the physical object with the object of value (the island).

When the tokens are created (or, under some circumstances later) what people can do with them is contractually agreed to. If a person exchanges his token for some good or service, he must ensure the token is assigned to its new owner. This can be done by, for example, going online and transferring the account in the ledger from one person to another (this used particularly if there is no physical object "instantiating" the token), providing all the usual evidence of ability to make that change, such as user name and password. If there is a physical object, then just handing that to the new owner is sufficient (if allowed by the original contract). Thus, the user is "authenticated" either by his possession of the physical object or by the more usual ways to link a person to a digital file or service. In general, the user/purchaser "gives" the vendor the digital token. How he does so can be quite varied.

I. Digital Fingerprinting

"Digital fingerprinting" refers to the creation and use of digital records (digital fingerprints) derived from properties of a physical object, which digital records are typically stored in a database. Digital fingerprints maybe used to reliably and unambiguously identify or authenticate corresponding physical objects, track them through supply chains, record their provenance and changes over time, and for many other uses and applications including providing secure links between physical and digital objects as described above.

In more detail, as used herein, digital fingerprints typically include information, preferably in the form of numbers or "feature vectors," that describes features that appear at particular locations, called points of interest, of a two-dimensional (2-D) or three-dimensional (3-D) object. In the case of a 2-D object, the points of interest are preferably on a surface of the object. 2D digital fingerprints may also be produced by looking through the object and fingerprinting the result. There, the features do come from "inside" but the digital fingerprint is two-dimensional. In the 3-D case, the points of interest may be on the surface or in the interior of the object. In some applications, an object "feature template" may be used to define locations or regions of interest for a class of objects. Feature vectors may be extracted from the regions of interest. The digital fingerprints may be derived or generated from digital data of the object which may be, for example, image data.

In the context of this description a digital fingerprint is a digital representation of the physical object. It can be captured from features of the surface, the internals, the progression of the object in time, and any other repeatable way that creates a digital fingerprint that can be uniquely and securely assigned to the particular digital object. Though not mentioned herein, secure protection of the physical object, its digital fingerprint, and of the associated digital objects are assumed.

In the context of this document, a digital fingerprint is a natural "digitization" of the object, obtainable unambiguously from the digital object. It is the key to the digital object, providing the link between the physical object and the digital. These digital fingerprints, in order to accomplish the kind of physical-digital linkage desired, must have certain properties. Our approach has these properties, while many other forms of digital fingerprinting do not. Among these properties are:

The digital fingerprint must be unambiguously derived from a single individual object.

It must remain matchable (to a corresponding datastore record) with high confidence even as the individual object ages, wears, or is otherwise changed.

Returning to the 2-D and 3-D object examples mentioned above, feature extraction or feature detection may be used to characterize points of interest. In an embodiment, this may be done in various ways. Two examples include Scale-Invariant Feature Transform (or SIFT) and Speeded Up Robust features (or SURF). Both are described in the literature. For example: "Feature detection and matching are used in image registration, object tracking, object retrieval etc. There are number of approaches used to detect and matching of features as SIFT (Scale Invariant Feature Transform), SURF (Speeded up Robust Feature), FAST, ORB etc. SIFT and SURF are most useful approaches to detect and matching of features because it is invariant to scale, rotate, translation, illumination, and blur." MISTRY, Darshana et al., Comparison of Feature Detection and Matching Approaches: SIFT and SURF, GRD Journals—Global Research and Development Journal for Engineering|Volume 2|Issue 4|March 2017.

In some embodiments, digital fingerprint features may be matched, for example, based on finding a minimum threshold distance. Distances can be found using Euclidean distance, Manhattan distance etc. If distances of two points are less than a prescribed minimum threshold distance, those key points may be known as matching pairs. Matching a digital fingerprint may comprise assessing a number of matching pairs, their locations or distance and other characteristics. Many points may be assessed to calculate a likelihood of a match, since, generally, a perfect match will not be found. In some applications a "feature template" may be used to define locations or regions of interest for a class of objects. Matching features may focus within the regions of interest.

In an embodiment, features may be used to represent information derived from a digital image in a machine-readable and useful way. Features may be point, line, edges, and blob of an image etc. There are areas as image registration, object tracking, and object retrieval etc. that employ a system or processor to detect and match correct features. Therefore, it may be desirable to find features in ways that are invariant to rotation, scale, translation, illumination, noisy and blur images. The search of interest points from one object image to corresponding images can be very challenging work. The search may preferably be done such that same physical interest points can be found in different views. Once located, points of interest and their respective characteristics may be aggregated to form the digital fingerprint (generally including 2-D or 3-D location parameters).

Put another way, a digital fingerprint is a natural "digitization" of the object, obtainable unambiguously from the digital object. It is the key to the digital object, providing the link between the physical object and the digital. These digital fingerprints, in order to accomplish the kind of physical-digital linkage desired, must have certain properties. Among these properties are: 1) the digital fingerprint extractable unambiguously from a single individual object; 2) the digital fingerprint remains matchable with high confidence as the individual object ages, wears, or is otherwise changed.

EXAMPLES

Example 1. A method comprising:
inducting a physical object into a rights management system by:
acquiring a digital fingerprint of the physical object;
creating an associated digital file ("ADF") of the physical object in a secure datastore;
storing the digital fingerprint of the physical object in the ADF, so as to securely and uniquely link the ADF to the physical object as a digital counterpart in an unspoofable manner;
initializing a digital ledger stored in or linked to the ADF, the digital ledger storing at least one asset-backed token representing an interest in or transaction affecting the physical object; and
updating the digital ledger to realize transactions that utilize the token to exchange real value backed by the physical object.

Example 2. The method of example, further comprising:
providing a means for the second party to access the ADF, wherein the second party access to the ADF is limited to dealing with the interest transferred to the second party as reflected in the ledger;
notifying the second party of the means provided for it to access the ADF; and
storing data in or linked to the ADF indicating the means for the second party to access the ADF.

Example 3. The method of example 2, further comprising:
storing a key object digital fingerprint in the ADF;
associating the stored key object digital fingerprint to the second party interest; and
wherein the means for the second party to access the ADF comprises authenticating the second party or her transferee by matching a tendered digital fingerprint to the stored key object digital fingerprint within a selected threshold level of confidence.

Example 4. The method of example 1 wherein:
the interest represented by the token stored in the ledger is at least one of a set of interests comprising (a) full or partial ownership of the physical object, (b) partial or full ownership of a security interest in the physical object, and (c) a limited right to use the physical object.

Example 5. The method of example 4, further comprising:
receiving input data that identifies an event associated with the physical object;
analyzing the ADF based on the occurrence of the event;
updating zero or more tokens in the ADF based on the analysis; and
transmitting a message to an entity identified in the ADF as a holder of one or more of the updated tokens.

Example 6. The method of example 5, further comprising:
programmatically applying occurrence of the event to the terms of an applicable agreement to obtain a result;
executing an action responsive to the result in accordance with the agreement; and
transmitting a message notifying a party to the agreement of the second action.

Example 7. The method of example 6 wherein:
the action executed responsive to the result in accordance with the agreement comprises effecting a change of rights in the physical object by updating the ADF linked to the physical object; and the message notifies an owner of the physical object of the change of rights.

Example 8. The method of example 7 wherein updating the ADF includes programmatically generating new or revised tokens in the ADF to reflect the change of rights; and distributing the new or revised tokens electronically.

Example 9. The method of example 8 wherein the change of rights is one of a release of a security interest in the physical object or a change of a security interest to an ownership interest.

Example 10. The method of example 1 further comprising:
authenticating a user to grant access to a digital counterpart of a physical object, wherein the digital counterpart comprises an associated digital file ("ADF") that is stored in a secure database, and authenticating the user includes matching a target digital fingerprint tendered by the user to a digital fingerprint previously inducted in the database and stored in or linked to the ADF;
receiving an input from the authenticated user; and
executing a predetermined action.

Example 11. The method of example 10 wherein the predetermined action comprises triggering an application to carry out contracted terms based on pre-defined triggers.

Example 12. The method of example 10 wherein the predetermined action comprises querying the ADF to identify an entity and transmitting a message to the identified entity, the message based on the update to the ledger.

Example 13. The method of example 6 wherein the agreement is one of a set of agreements that affects an interest in the physical object including:
a hypothecation agreement, a loan agreement, a sale agreement, an agreement to partition or divide the physical object, an agreement in lieu of foreclosure, a tax lien, a will, a securitization agreement, a brokerage or agency agreement.

Example 14. The method of example 6 wherein the agreement is one of a set of agreements that affects an interest in the physical object including:
a fractional hypothecation, a fractional monetization, and a fractional ownership.

Example 15. The method of example 1 including storing supplemental data related to the physical object in the ADF, wherein the supplemental data includes at least one of:
high-quality digital photographs of the physical object, and
a ledger of current and past owners of the physical object.

Example 16. The method of example 1 including storing supplemental data related to the physical object in the ADF, wherein the supplemental data includes at least one of:
a certificate of origin of the physical object,
a certificate issued by the most recent professional authenticator, or
what is known about the physical object's provenance and its subsequent history, and
a digital media file associated with the physical object.

Example 17. The method of example 1 including storing supplemental data related to the physical object in the ADF, wherein the supplemental data includes at least one of:
tokens that represent fractional ownership;
a ledger of current and past owners of the object; or
a ledger of transfers and transactions involving interests represented by digital tokens access tokens.

Example 18. A rights server system comprising:
a digital processor to execute stored program code;
a secure datastore operatively coupled to the digital processor,
the datastore including an associated digital file ("ADF") of a physical object, wherein the ADF includes a digital fingerprint extracted from the physical object, thereby linking the ADF to the physical object,
the program code arranged to cause the digital processor, upon execution of the program code, to carry out:
initialize a transaction ledger in ADF;
tokenize a physical object by creating a digital token and securely linking the token to the physical object by storing the token in the ADF linked to the physical object, wherein the creation of the token is under supervision or control of a trusted entity that has been authenticated to the rights server system, and wherein the digital token represents and specifies an interest in the physical object;
transfer the digital token to a party; and
update the ledger and the digital token in the ADF to reflect the transfer of the token.

Example 19. The rights server system according to example 18 wherein the specified interest is an ownership interest in the physical object so that the transfer of the digital token transfers the ownership interest to the party in a secure unspoofable manner.

Example 20. The rights server system according to example 19 wherein the ownership interest is a fractional ownership interest.

Example 21. The rights server system according to example 18 wherein the specified interest is a right to use the physical object and the digital token is an access token.

Example 22. The rights server system according to example 18 wherein the specified interest is a security interest or lien in the physical object.

Scanning

In this application, the term "scan" in its various forms is used in the broadest sense, referring to any and all means for capturing an image or set of images, which may be in digital form or transformed into digital form. Images may, for example, be two dimensional, three dimensional, or in the form of a video. Thus a "scan" may refer to an image (or digital data that defines an image) captured by a scanner, a camera, a specially adapted sensor or sensor array (such as a CCD array), a microscope, a smartphone camera, a video camera, an x-ray machine, a sonar, an ultrasound machine, a microphone (or other instruments for converting sound waves into electrical energy variations), etc. Broadly, any device that can sense and capture either electromagnetic radiation or mechanical wave that has traveled through an object or reflected off an object or any other means to capture surface or internal structure of an object is a candidate to create a "scan" of an object.

Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure. Similarly, terms such as "scanner" and "scanning equipment" herein may be used in a broad sense to refer to any equipment capable of carrying out "scans" as defined above, or to equipment that carries out "scans" as defined above as part of their function. Attestable trusted scanners should be used to provide images for digital fingerprint creation. Scanner may be a single device or a multitude of devices and scanners working to enforce policy and procedures.

Authentication

In this application, various forms of the words "authenticate" and "authentication" are used broadly to describe both authentication and attempts to authenticate which comprise creating a digital fingerprint of the object. Therefore, "authentication" is not limited to specifically describing successful matching of inducted objects or generally describing the outcome of attempted authentications. As one example, a counterfeit object may be described as "authenticated" even if the "authentication" fails to return a matching result. In another example, in cases where unknown objects are "authenticated" without resulting in a match and the authentication attempt is entered into a database for subsequent reference the action described as "authentication" or "attempted authentication" may also, post facto, also be properly described as an "induction". An authentication of an object may refer to the induction or authentication of an entire object or of a portion of an object.

More information about digital fingerprinting can be found in various patents and publications assigned to Alitheon, Inc. including, for example, the following: DIGITAL FINGERPRINTING, U.S. Pat. No. 8,610,762; OBJECT IDENTIFICATION AND INVENTORY MANAGEMENT, U.S. Pat. No. 9,152,862; DIGITAL FINGERPRINTING OBJECT AUTHENTICATION AND ANTI-COUNTERFEITING SYSTEM, U.S. Pat. No. 9,443,298; PERSONAL HISTORY IN TRACK AND TRACE SYSTEM, U.S. Pat. No. 10,037,537; PRESERVING AUTHENTICATION UNDER ITEM CHANGE, U.S. Pat. App. Pub. No. 2017-0243230 A1. Each of these patents and publications is hereby incorporated by this reference.

One of skill in the art will recognize that the concepts taught herein can be tailored to a particular application in many other ways. In particular, those skilled in the art will recognize that the illustrated examples are but one of many alternative implementations that will become apparent upon reading this disclosure. It will be obvious to those having skill in the art that many changes may be made to the details of the above-described embodiments without departing from the underlying principles of the disclosure.

We claim:

1. A method of inducting a physical object into a rights management system, the method comprising:
acquiring a digital fingerprint of the physical object;
creating an associated digital file ("ADF") of the physical object in a secure datastore;
storing the digital fingerprint of the physical object in the ADF, so as to securely and uniquely link the ADF to the physical object as a digital counterpart in an unspoofable manner;
initializing a digital ledger stored in or linked to the ADF, the digital ledger storing at least one asset-backed token representing an interest in or transaction affecting the physical object; and
updating the digital ledger to realize transactions that utilize the at least one asset-backed token to exchange real value backed by the physical object.

2. The method of claim 1, further comprising:
providing a second party with access to the ADF, wherein the second party's access to the ADF is limited to dealing with an interest related to the physical object transferred to the second party as reflected in the digital ledger;
notifying the second party of the provided access to the ADF; and
storing data in or linked to the ADF indicating the provided access to the ADF.

3. The method of claim 2, further comprising:
storing a key object digital fingerprint in the ADF; and
associating the stored key object digital fingerprint to the second party interest,
wherein providing the second party with access to the ADF includes authenticating the second party or her transferee by matching a tendered digital fingerprint to the stored key object digital fingerprint within a selected threshold level of confidence.

4. The method of claim 1 wherein:
the interest represented by the token stored in the ledger is at least one of a set of interests comprising (a) full or partial ownership of the physical object, (b) partial or full ownership of a security interest in the physical object, and (c) a limited right to use the physical object.

5. The method of claim 4, further comprising:
receiving input data that identifies an event associated with the physical object;
analyzing the ADF based on an occurrence of the event;
updating zero or more tokens in the ADF based on the analyzing of the ADF; and
transmitting a message to an entity identified in the ADF as a holder of one or more of the updated tokens.

6. The method of claim 5, further comprising:
programmatically applying the occurrence of the event to terms of an applicable agreement to obtain a result;
executing an action responsive to the result in accordance with the agreement; and
transmitting a message notifying a party to the agreement of the action.

7. The method of claim 6 wherein:
the action executed responsive to the result in accordance with the agreement comprises effecting a change of rights in the physical object by updating the ADF linked to the physical object; and
the message notifies an owner of the physical object of the change of rights.

8. The method of claim 7 wherein updating the ADF includes programmatically generating new or revised tokens in the ADF to reflect the change of rights; and distributing the new or revised tokens electronically.

9. The method of claim 8 wherein the change of rights is one of a release of a security interest in the physical object or a change of a security interest to an ownership interest.

10. The method of claim 1 further comprising:
authenticating a user to grant access to a digital counterpart of a physical object, wherein the digital counterpart comprises an associated digital file ("ADF") that is stored in a secure database, and authenticating the user includes matching a target digital fingerprint tendered by the user to a digital fingerprint previously inducted in the database and stored in or linked to the ADF;
receiving an input from the authenticated user; and
executing a predetermined action.

11. The method of claim 10 wherein the predetermined action comprises triggering an application to carry out contracted terms based on pre-defined triggers.

12. The method of claim 10 wherein the predetermined action comprises querying the ADF to identify an entity and transmitting a message to the identified entity, the message based on the update to the ledger.

13. The method of claim 6 wherein the agreement is one of a set of agreements that affects an interest in the physical object including:
a hypothecation agreement, a loan agreement, a sale agreement, an agreement to partition or divide the physical object, an agreement in lieu of foreclosure, a tax lien, a will, a securitization agreement, a brokerage or agency agreement.

14. The method of claim 6 wherein the agreement is one of a set of agreements that affects an interest in the physical object including:
a fractional hypothecation, a fractional monetization, and a fractional ownership.

15. The method of claim 1 including storing supplemental data related to the physical object in the ADF, wherein the supplemental data includes at least one of:
high-quality digital photographs of the physical object, and
a ledger of current and past owners of the physical object.

16. The method of claim 1 further comprising storing supplemental data related to the physical object in the ADF, wherein the supplemental data includes at least one of:
a certificate of origin of the physical object,
a certificate issued by a most recent professional authenticator,
information about a provenance of the physical object and a subsequent history of the physical object, or
a digital media file associated with the physical object.

17. The method of claim 1 further comprising storing supplemental data related to the physical object in the ADF, wherein the supplemental data includes at least one of:
tokens that represent fractional ownership;
a ledger of current and past owners of the object; or
a ledger of transfers and transactions involving interests represented by digital tokens access tokens.

18. A rights server system comprising:
a digital processor to execute stored program code; and
a secure datastore operatively coupled to the digital processor,
the datastore including an associated digital file ("ADF") of a physical object, wherein the ADF includes a digital fingerprint extracted from the physical object, thereby linking the ADF to the physical object,
the program code arranged to cause the digital processor, upon execution of the program code, to:
initialize a transaction ledger in ADF;
tokenize a physical object by creating a digital token and securely linking the token to the physical object by storing the token in the ADF linked to the physical object, wherein creation of the token is under supervision or control of a trusted entity that has been authenticated to the rights server system, and wherein the digital token represents and specifies an interest in the physical object;
transfer the digital token to a party; and
update the ledger and the digital token in the ADF to reflect the transfer of the token.

19. The rights server system according to claim 18 wherein the specified interest is an ownership interest in the physical object so that the transfer of the digital token transfers the ownership interest to the party in a secure unspoofable manner.

20. The rights server system according to claim 19 wherein the ownership interest is a fractional ownership interest.

21. The rights server system according to claim 18 wherein the specified interest is a right to use the physical object and the digital token is an access token.

22. The rights server system according to claim 18 wherein the specified interest is a security interest or lien in the physical object.

* * * * *